US012233831B2

(12) United States Patent
Zwegers et al.

(10) Patent No.: US 12,233,831 B2
(45) Date of Patent: Feb. 25, 2025

(54) VEHICLE BRAKE COOLING SYSTEM HAVING DYNAMICALLY ADJUSTABLE AIR VENTS FOR ACTIVE BRAKE COOLING

(71) Applicant: Toyota Motor Engineering & Manufacturing North America, Inc, Plano, TX (US)

(72) Inventors: Corey Zwegers, Dexter, MI (US); Robert C. MacArthur, Ypsilanti, MI (US); Tommy E. Stubblefield, Surprise, AZ (US); Claudia A. Ma, Northville, MI (US); Shigenori Shibata, Ann Arbor, MI (US); Adam R. VanAntwerp, Chelsea, MI (US); Clinton M. Hamre, Peoria, AZ (US)

(73) Assignee: TOYOTA MOTOR ENGINEERING & MANUFACTURING NORTH AMERICA, INC, Plano, TX (US)

( * ) Notice: Subject to any disclaimer, the term of this patent is extended or adjusted under 35 U.S.C. 154(b) by 888 days.

(21) Appl. No.: 17/315,765

(22) Filed: May 10, 2021

(65) Prior Publication Data

US 2022/0355770 A1 Nov. 10, 2022

(51) Int. Cl.
*B60T 5/00* (2006.01)
*B62D 37/02* (2006.01)
*B62D 35/00* (2006.01)

(52) U.S. Cl.
CPC ............... *B60T 5/00* (2013.01); *B62D 37/02* (2013.01); *B62D 35/005* (2013.01)

(58) Field of Classification Search
None
See application file for complete search history.

(56) References Cited

U.S. PATENT DOCUMENTS 4,810,021 A 3/1989 Burst
6,857,510 B2 * 2/2005 Schneider ............... F16D 65/78
188/71.6
(Continued)

FOREIGN PATENT DOCUMENTS

CN 108791234 A * 11/2018 ........... B60G 17/005
CN 109591783 A * 4/2019 ............. B60T 17/22
(Continued)

OTHER PUBLICATIONS

CN108791234A Machine Translation (Year: 2018).*

*Primary Examiner* — Melanie Torres Williams
(74) *Attorney, Agent, or Firm* — Jordan IP Law, LLC

(57) ABSTRACT

A vehicle, a vehicle brake cooling system, a computer program product, and a method of controlling a vehicle in a manner to achieve enhanced aerodynamic performance of the vehicle and active cooling to the wheel brakes during operation of the vehicle. The vehicle includes one or more a vehicle air vents moveable between a first position and a second position, and one or more processors of a computing system. The one or more processors are configured to dynamically conduct, in response to a detection as sensor data one or more of a current position of the vehicle air vents, a current temperature of vehicle wheel brakes, and a current speed of the vehicle, a vehicle brake analysis of the sensor data. The one or more processors are also configured to dynamically control, in response to the vehicle brake analysis and wireless network data, the vehicle air vents between the first position to enhance the aerodynamic performance of the vehicle and the second position to selectively direct ambient airflow to the vehicle wheel brakes in a manner that selectively cools the vehicle wheel brakes.

18 Claims, 11 Drawing Sheets

(56) References Cited

U.S. PATENT DOCUMENTS

| | | | |
|---|---|---|---|
| 7,040,690 B2 | 5/2006 | Soja et al. | |
| 8,590,937 B2 * | 11/2013 | Hino | B60C 23/18 |
| | | | 165/104.19 |
| 9,004,241 B2 * | 4/2015 | Browne | F16D 65/847 |
| | | | 188/71.6 |
| 9,487,251 B2 | 11/2016 | Gibson et al. | |
| 9,726,067 B2 | 8/2017 | Hakeem et al. | |

FOREIGN PATENT DOCUMENTS

| | | | | |
|---|---|---|---|---|
| DE | 3902886 A1 | 8/1989 | | |
| GB | 2357477 A * | 6/2001 | | B60T 5/00 |

* cited by examiner

VEHICLE BRAKE COOLING SYSTEM HAVING DYNAMICALLY ADJUSTABLE AIR VENTS FOR ACTIVE BRAKE COOLING

TECHNICAL FIELD

One or more embodiments relate generally to a vehicle, a vehicle brake cooling system, a computer program product, and a method of controlling a vehicle in a manner to achieve enhanced aerodynamic performance of the vehicle and active cooling to the wheel brakes during operation of the vehicle.

BACKGROUND

Vehicle spoilers are installed on vehicles to enhance vehicle aerodynamics during operation of the vehicle. Such spoilers, however, are not utilized to provide an efficient and cost-effective method for active cooling of the wheel brakes during operation of the vehicle.

Some vehicle designs include a vehicle spoiler having channels to redirect air in order to cool the wheel brakes. Such a vehicle design, however, lacks a system that facilitates the dynamic adjustment of the vehicle spoiler and/or the channels for the purpose of cooling the brakes during operation of the vehicle.

BRIEF SUMMARY

In accordance with one or more embodiments, one or more example vehicles, vehicle brake cooling systems, vehicle spoiler systems, computer systems, computer program products, and methods are provided to achieve both enhanced vehicle aerodynamics and active brake cooling during operation of the vehicle. An example vehicle comprises one or more vehicle air vents located in various regions of the vehicle that is actively or dynamically controlled for selective movement which not only enhances vehicle aerodynamics during operation of the vehicle, but also provides active cooling of the wheel brakes. Such a design provides a cost-effective and efficient design that does not require additional components, prioritizes vehicle aerodynamics, and provides an effective way of dynamically cooling the wheel brakes.

In accordance with one or more embodiments, an example vehicle comprises one or more of the following: wheel brakes; a vehicle spoiler having one or more vehicle spoiler air vents moveable between a first position to enhance the aerodynamic performance of the vehicle and a second position to selectively direct ambient airflow to the wheel brakes in a manner that selectively cools the wheel brakes; and one or more processors. The one or more processors are configured to execute a set of instructions that cause the one or more processors to: dynamically conduct, in response to a detection as sensor data one or more of a current position of the vehicle spoiler air vents, a current temperature of the wheel brakes, and a current speed of the vehicle; dynamically conduct a vehicle brake analysis of the sensor data; and dynamically control, in response to the vehicle brake analysis and network data that includes one or more of geographic map data, weather data, crowdsourced traffic data, and roadside sign data, the vehicle spoiler air vents between the first position and the second position.

In accordance with one or more embodiments, an example vehicle comprises one or more of the following: wheel brakes; a vehicle spoiler having one or more vehicle spoiler air vents moveable between a first position to enhance the aerodynamic performance of the vehicle and a second position to selectively direct the flow of ambient air to the wheel brakes in a manner that selectively cools the wheel brakes; and one or more processors. The one or more processors are configured to execute a set of instructions that cause the one or more processors to: dynamically conduct, in response to a detection as sensor data one or more of a current position of the vehicle spoiler air vents, a current temperature of the wheel brakes, and a current speed of the vehicle, a vehicle brake analysis of the sensor data; and dynamically adjust, in response to the vehicle brake analysis and network data that includes one or more of geographic map data, weather data, crowdsourced traffic data, and roadside sign data, a position of the vehicle spoiler air vents to selectively direct ambient airflow directly to the wheel brakes in a manner that selectively cools the wheel brakes.

In accordance with one or more embodiments, an example vehicle comprises one or more of the following: wheel brakes; a vehicle spoiler having one or more vehicle spoiler air vents moveable between a first position to enhance the aerodynamic performance of the vehicle and a second position to selectively direct the flow of ambient air to the wheel brakes in a manner that selectively cools the wheel brakes; and one or more processors. The one or more processors are configured to execute a set of instructions that cause the one or more processors to: dynamically conduct, in response to a detection as sensor data one or more of a current position of the vehicle spoiler air vents, a current temperature of the wheel brakes, ambient airflow and a current speed of the vehicle; dynamically conduct a vehicle brake analysis of the sensor data; and dynamically thermally manage, in response to the vehicle brake analysis and network data that includes one or more of geographic map data, weather data, crowdsourced traffic data, and roadside sign data, the wheel brakes by selectively directing ambient airflow to the wheel brakes via the vehicle spoiler air vents in a manner that selectively cools the wheel brakes. The set of instructions, when executed by the one or more processors, cause the one or more processors to compare the current temperature of wheel brakes to a predetermined threshold wheel brake temperature. The set of instructions, when executed by the one or more processors, cause the one or more processors to dynamically control the vehicle spoiler air vents by selectively moving the vehicle spoiler air vents to the second position when the detected current temperature or the estimated current temperature of the wheel brakes is greater than the predetermined threshold wheel brake temperature.

In accordance with one or more embodiments, an example vehicle comprises one or more of the following: wheel brakes; a vehicle underbody having one or more vehicle underbody air vents moveable between a first position to enhance the aerodynamic performance of the vehicle and a second position to selectively direct ambient airflow to the wheel brakes in a manner that selectively cools the wheel brakes; and one or more processors. The one or more processors are configured to execute a set of instructions that cause the one or more processors to: dynamically conduct, in response to a detection as sensor data one or more of a current position of the vehicle underbody air vents, a current temperature of the wheel brakes, ambient airflow and a current speed of the vehicle; dynamically conduct a vehicle brake analysis of the sensor data; and dynamically control, in response to the vehicle brake analysis and network data that includes one or more of geographic map data, weather data, crowdsourced traffic data, and roadside sign data, the vehicle underbody air vents between the first position and the second position.

In accordance with one or more embodiments, an example vehicle comprises one or more of the following: wheel brakes; a vehicle underbody having one or more vehicle underbody air vents moveable between a first position to enhance the aerodynamic performance of the vehicle and a second position to selectively direct the flow of ambient air to the wheel brakes in a manner that selectively cools the wheel brakes; and one or more processors. The one or more processors are configured to execute a set of instructions that cause the one or more processors to: dynamically conduct, in response to a detection as sensor data one or more of a current position of the vehicle underbody air vents, a current temperature of the wheel brakes, ambient airflow and a current speed of the vehicle, a vehicle brake analysis of the sensor data; and dynamically adjust, in response to the vehicle brake analysis and network data that includes one or more of geographic map data, weather data, crowdsourced traffic data, and roadside sign data, a position of the vehicle underbody air vents to selectively direct ambient airflow directly to the wheel brakes in a manner that selectively cools the wheel brakes.

In accordance with one or more embodiments, an example vehicle comprises one or more of the following: wheel brakes; a vehicle underbody having one or more vehicle underbody air vents moveable between a first position to enhance the aerodynamic performance of the vehicle and a second position to selectively direct the flow of ambient air to the wheel brakes in a manner that selectively cools the wheel brakes; and one or more processors. The one or more processors are configured to execute a set of instructions that cause the one or more processors to: dynamically conduct, in response to a detection as sensor data one or more of a current position of the vehicle underbody air vents, a current temperature of the wheel brakes, ambient airflow and a current speed of the vehicle; dynamically conduct a vehicle brake analysis of the sensor data; and dynamically thermally manage, in response to the vehicle brake analysis and network data that includes one or more of geographic map data, weather data, crowdsourced traffic data, and roadside sign data, the wheel brakes by selectively directing ambient airflow to the wheel brakes via the vehicle underbody air vents in a manner that selectively cools the wheel brakes. The set of instructions, when executed by the one or more processors, cause the one or more processors to compare the current temperature of wheel brakes or the estimated current temperature of the wheel brakes to a predetermined threshold wheel brake temperature. The set of instructions, when executed by the one or more processors, cause the one or more processors to dynamically control the vehicle underbody air vents by selectively moving the vehicle underbody air vents to the second position when the detected current temperature or the estimated current temperature is greater than the predetermined threshold wheel brake temperature.

In accordance with one or more embodiments, an example vehicle comprises one or more of the following: wheel brakes; one or more vehicle side panels having one or more vehicle side panel air vents moveable between a first position to enhance the aerodynamic performance of the vehicle and a second position to selectively direct ambient airflow to the wheel brakes in a manner that selectively cools the wheel brakes; and one or more processors. The one or more processors are configured to execute a set of instructions that cause the one or more processors to: dynamically conduct, in response to a detection as sensor data one or more of a current position of the vehicle side panel air vents, a current temperature of the wheel brakes, an estimated temperature of the wheel brakes, and a current speed of the vehicle; dynamically conduct a vehicle brake analysis of the sensor data; and dynamically control, in response to the vehicle brake analysis and network data that includes one or more of geographic map data, weather data, crowdsourced traffic data, and roadside sign data, the vehicle side panel air vents between the first position and the second position.

In accordance with one or more embodiments, an example vehicle comprises one or more of the following: wheel brakes; one or more vehicle side panels having one or more vehicle side panel air vents moveable between a first position to enhance the aerodynamic performance of the vehicle and a second position to selectively direct the flow of ambient air to the wheel brakes in a manner that selectively cools the wheel brakes; and one or more processors. The one or more processors are configured to execute a set of instructions that cause the one or more processors to: dynamically conduct, in response to a detection as sensor data one or more of a current position of the vehicle side panel air vents, a current temperature of the wheel brakes, and a current speed of the vehicle, a vehicle brake analysis of the sensor data; and dynamically adjust, in response to the vehicle brake analysis and network data that includes one or more of geographic map data, weather data, crowdsourced traffic data, and roadside sign data, a position of the vehicle side panel air vents to selectively direct ambient airflow directly to the wheel brakes in a manner that selectively cools the wheel brakes.

In accordance with one or more embodiments, an example vehicle comprises one or more of the following: wheel brakes; one or more vehicle side panels having one or more vehicle side panel air vents moveable between a first position to enhance the aerodynamic performance of the vehicle and a second position to selectively direct the flow of ambient air to the wheel brakes in a manner that selectively cools the wheel brakes; and one or more processors. The one or more processors are configured to execute a set of instructions that cause the one or more processors to: dynamically conduct, in response to a detection as sensor data one or more of a current position of the vehicle side panel air vents, a current temperature of the wheel brakes, and a current speed of the vehicle; dynamically conduct a vehicle brake analysis of the sensor data; and dynamically thermally manage, in response to the vehicle brake analysis and network data that includes one or more of geographic map data, weather data, crowdsourced traffic data, and roadside sign data, the wheel brakes by selectively directing ambient airflow to the wheel brakes via the vehicle side panel air vents in a manner that selectively cools the wheel brakes. The set of instructions, when executed by the one or more processors, cause the one or more processors to compare the current temperature or estimated temperature of wheel brakes to a predetermined threshold wheel brake temperature. The set of instructions, when executed by the one or more processors, cause the one or more processors to dynamically control the vehicle side panel air vents by selectively moving the vehicle underbody air vents to the second position when the detected current temperature is greater than the predetermined threshold wheel brake temperature.

In accordance with one or more embodiments, an example vehicle brake cooling system for cooling wheel brakes comprises one or more of the following: one or more vehicle spoiler air vents moveable between a first position to enhance the aerodynamic performance of the vehicle and a second position to selectively direct ambient airflow to the wheel brakes in a manner that selectively cools the wheel brakes; and one or more processors. The one or more processors are configured to execute a set of instructions that cause the one or more processors to: dynamically conduct, in response to a detection as sensor data one or more of a current position of the vehicle spoiler air vents, a current temperature of the wheel brakes, ambient airflow and a current speed of the vehicle; dynamically conduct a vehicle brake analysis of the sensor data; and dynamically control, in response to the vehicle brake analysis and network data that includes one or more of geographic map data, weather data, crowdsourced traffic data, and roadside sign data, the vehicle spoiler air vents between the first position and the second position.

In accordance with one or more embodiments, an example vehicle brake cooling system for cooling wheel brakes comprises one or more of the following: one or more vehicle spoiler air vents moveable between a first position to enhance the aerodynamic performance of the vehicle and a second position to selectively direct the flow of ambient air to the wheel brakes in a manner that selectively cools the wheel brakes; and one or more processors. The one or more processors are configured to execute a set of instructions that cause the one or more processors to: dynamically conduct, in response to a detection as sensor data one or more of a current position of the vehicle spoiler air vents, a current temperature of the wheel brakes, ambient airflow and a current speed of the vehicle, a vehicle brake analysis of the sensor data; and dynamically adjust, in response to the vehicle brake analysis and network data that includes one or more of geographic map data, weather data, crowdsourced traffic data, and roadside sign data, a position of the vehicle spoiler air vents to selectively direct ambient airflow directly to the wheel brakes in a manner that selectively cools the wheel brakes.

In accordance with one or more embodiments, an example vehicle brake cooling system for cooling wheel brakes comprises one or more of the following: one or more vehicle spoiler air vents moveable between a first position to enhance the aerodynamic performance of the vehicle and a second position to selectively direct the flow of ambient air to the wheel brakes in a manner that selectively cools the wheel brakes; and one or more processors. The one or more processors are configured to execute a set of instructions that cause the one or more processors to: dynamically conduct, in response to a detection as sensor data one or more of a current position of the vehicle spoiler air vents, a current temperature of the wheel brakes, ambient airflow and a current speed of the vehicle; dynamically conduct a vehicle brake analysis of the sensor data; and dynamically thermally manage, in response to the vehicle brake analysis and network data that includes one or more of geographic map data, weather data, crowdsourced traffic data, and roadside sign data, the wheel brakes by selectively directing ambient airflow to the wheel brakes via the vehicle spoiler air vents in a manner that selectively cools the wheel brakes. The set of instructions, when executed by the one or more processors, cause the one or more processors to compare the current temperature of wheel brakes to a predetermined threshold wheel brake temperature. The set of instructions, when executed by the one or more processors, cause the one or more processors to dynamically control the vehicle spoiler air vents by selectively moving the vehicle spoiler air vents to the second position when the detected current temperature or the estimated current temperature of the wheel brakes is greater than the predetermined threshold wheel brake temperature.

In accordance with one or more embodiments, an example vehicle brake cooling system for cooling wheel brakes comprises one or more of the following: one or more vehicle underbody air vents moveable between a first position to enhance the aerodynamic performance of the vehicle and a second position to selectively direct ambient airflow to the wheel brakes in a manner that selectively cools the wheel brakes; and one or more processors. The one or more processors are configured to execute a set of instructions that cause the one or more processors to: dynamically conduct, in response to a detection as sensor data one or more of a current position of the vehicle underbody air vents, a current temperature of the wheel brakes, ambient airflow and a current speed of the vehicle; dynamically conduct a vehicle brake analysis of the sensor data; and dynamically control, in response to the vehicle brake analysis and network data that includes one or more of geographic map data, weather data, crowdsourced traffic data, and roadside sign data, the vehicle underbody air vents between the first position and the second position.

In accordance with one or more embodiments, an example vehicle brake cooling system for cooling wheel brakes comprises one or more of the following: one or more vehicle underbody air vents moveable between a first position to enhance the aerodynamic performance of the vehicle and a second position to selectively direct the flow of ambient air to the wheel brakes in a manner that selectively cools the wheel brakes; and one or more processors. The one or more processors are configured to execute a set of instructions that cause the one or more processors to: dynamically conduct, in response to a detection as sensor data one or more of a current position of the vehicle underbody air vents, a current temperature of the wheel brakes, ambient airflow and a current speed of the vehicle, a vehicle brake analysis of the sensor data; and dynamically adjust, in response to the vehicle brake analysis and network data that includes one or more of geographic map data, weather data, crowdsourced traffic data, and roadside sign data, a position of the vehicle underbody air vents to selectively direct ambient airflow directly to the wheel brakes in a manner that selectively cools the wheel brakes.

In accordance with one or more embodiments, an example vehicle brake cooling system for cooling wheel brakes comprises one or more of the following: one or more vehicle underbody air vents moveable between a first position to enhance the aerodynamic performance of the vehicle and a second position to selectively direct the flow of ambient air to the wheel brakes in a manner that selectively cools the wheel brakes; and one or more processors. The one or more processors are configured to execute a set of instructions that cause the one or more processors to: dynamically conduct, in response to a detection as sensor data one or more of a current position of the vehicle underbody air vents, a current temperature of the wheel brakes, ambient airflow and a current speed of the vehicle; dynamically conduct a vehicle brake analysis of the sensor data; and dynamically thermally manage, in response to the vehicle brake analysis and network data that includes one or more of geographic map data, weather data, crowdsourced traffic data, and roadside sign data, the wheel brakes by selectively directing ambient airflow to the wheel brakes via the vehicle underbody air vents in a manner that selectively cools the wheel brakes. The set of instructions, when executed by the one or more processors, cause the one or more processors to compare the current temperature of wheel brakes or the estimated current temperature of the wheel brakes to a predetermined threshold wheel brake temperature. The set of instructions, when executed by the one or more processors, cause the one or more processors to dynamically control the vehicle underbody air vents by selectively moving the vehicle underbody air vents to the second position when the detected current temperature or the estimated current temperature is greater than the predetermined threshold wheel brake temperature.

In accordance with one or more embodiments, an example vehicle brake cooling system for cooling wheel brakes comprises one or more of the following: one or more vehicle side panels having one or more vehicle side panel air vents moveable between a first position to enhance the aerodynamic performance of the vehicle and a second position to selectively direct ambient airflow to the wheel brakes in a manner that selectively cools the wheel brakes; and one or more processors. The one or more processors are configured to execute a set of instructions that cause the one or more processors to: dynamically conduct, in response to a detection as sensor data one or more of a current position of the vehicle side panel air vents, a current temperature of the wheel brakes, an estimated temperature of the wheel brakes, and a current speed of the vehicle; dynamically conduct a vehicle brake analysis of the sensor data; and dynamically control, in response to the vehicle brake analysis and network data that includes one or more of geographic map data, weather data, crowdsourced traffic data, and roadside sign data, the vehicle side panel air vents between the first position and the second position.

In accordance with one or more embodiments, an example vehicle brake cooling system for cooling wheel brakes comprises one or more of the following: one or more vehicle side panels having one or more vehicle side panel air vents moveable between a first position to enhance the aerodynamic performance of the vehicle and a second position to selectively direct the flow of ambient air to the wheel brakes in a manner that selectively cools the wheel brakes; and one or more processors. The one or more processors are configured to execute a set of instructions that cause the one or more processors to: dynamically conduct, in response to a detection as sensor data one or more of a current position of the vehicle side panel air vents, a current temperature of the wheel brakes, and a current speed of the vehicle, a vehicle brake analysis of the sensor data; and dynamically adjust, in response to the vehicle brake analysis and network data that includes one or more of geographic map data, weather data, crowdsourced traffic data, and roadside sign data, a position of the vehicle side panel air vents to selectively direct ambient airflow directly to the wheel brakes in a manner that selectively cools the wheel brakes.

In accordance with one or more embodiments, an example vehicle brake cooling system for cooling wheel brakes comprises one or more of the following: one or more vehicle side panels having one or more vehicle side panel air vents moveable between a first position to enhance the aerodynamic performance of the vehicle and a second position to selectively direct the flow of ambient air to the wheel brakes in a manner that selectively cools the wheel brakes; and one or more processors. The one or more processors are configured to execute a set of instructions that cause the one or more processors to: dynamically conduct, in response to a detection as sensor data one or more of a current position of the vehicle side panel air vents, a current temperature of the wheel brakes, and a current speed of the vehicle; dynamically conduct a vehicle brake analysis of the sensor data; and dynamically thermally manage, in response to the vehicle brake analysis and network data that includes one or more of geographic map data, weather data, crowdsourced traffic data, and roadside sign data, the wheel brakes by selectively directing ambient airflow to the wheel brakes via the vehicle side panel air vents in a manner that selectively cools the wheel brakes. The set of instructions, when executed by the one or more processors, cause the one or more processors to compare the current temperature or estimated temperature of wheel brakes to a predetermined threshold wheel brake temperature. The set of instructions, when executed by the one or more processors, cause the one or more processors to dynamically control the vehicle side panel air vents by selectively moving the vehicle underbody air vents to the second position when the detected current temperature is greater than the predetermined threshold wheel brake temperature.

In accordance with one or more embodiments, an example computer program product is provided for a vehicle having wheel brakes and a vehicle spoiler with one or more vehicle spoiler air vents that are moveable between a first position to enhance the aerodynamic performance of the vehicle and a second position to selectively direct ambient airflow to the wheel brakes in a manner that selectively cools the wheel brakes. The example computer program product includes at least one computer readable medium comprising a set of instructions, which when executed by one or more processors, cause the one or more processors to: dynamically detect, as sensor data, a current position of the vehicle spoiler air vents, a current temperature of the wheel brakes, ambient airflow and a current speed of the vehicle; dynamically conduct, in response to the detection, vehicle brake analysis of the sensor data; and dynamically control, in response to the vehicle brake analysis and network data that includes one or more of geographic map data, weather data, crowdsourced traffic data, and roadside sign data, the vehicle spoiler air vents between the first position and the second position.

In accordance with one or more embodiments, an example computer program product is provided for a vehicle having a vehicle spoiler with one or more vehicle spoiler air vents. The example computer program product includes at least one computer readable medium comprising a set of instructions, which when executed by one or more processors, cause the one or more processors to dynamically detect, as sensor data, a current position of the vehicle spoiler air vents, a current temperature of the wheel brakes, ambient airflow and a current speed of the vehicle; dynamically conduct, in response to the detection, vehicle brake analysis of the sensor data; and dynamically adjust, in response to the vehicle brake analysis and network data that includes one or more of geographic map data, weather data, crowdsourced traffic data, and roadside sign data, a position of the vehicle spoiler air vents to selectively direct ambient airflow directly to the wheel brakes in a manner that selectively cools the wheel brakes.

In accordance with one or more embodiments, an example computer program product is provided for a vehicle having a vehicle spoiler with one or more vehicle spoiler air vents. The example computer program product includes at least one computer readable medium comprising a set of instructions, which when executed by one or more processors, cause the one or more processors to: dynamically detect, as sensor data, a current position of the vehicle spoiler air vents, a current temperature of the wheel brakes, ambient airflow and a current speed of the vehicle; dynamically conduct, in response to the detection, vehicle brake analysis of the sensor data; and dynamically thermally manage, in response to the vehicle brake analysis and network data that includes one or more of geographic map data, weather data, crowdsourced traffic data, and roadside sign data, the wheel brakes by selectively directing ambient airflow to the wheel brakes via the vehicle spoiler air vents in a manner that selectively cools the wheel brakes.

In accordance with one or more embodiments, an example method of controlling a vehicle is provided, the method comprising: dynamically detecting a current position of one or more vehicle spoiler air vents, a current temperature of wheel brakes of the vehicle, ambient airflow and a current speed of the vehicle; dynamically conducting, in response to the detection, vehicle brake analysis of the sensor data; and dynamically controlling, in response to the vehicle brake analysis and network data that includes one or more of geographic map data, weather data, crowdsourced traffic data, and roadside sign data, the vehicle spoiler air vents to selectively direct ambient airflow to the wheel brakes in a manner that selectively cools the wheel brakes.

In accordance with one or more embodiments, an example method of controlling a vehicle is provided, the method comprising: dynamically detecting a current position of one or more vehicle spoiler air vents, a current temperature of wheel brakes of the vehicle, ambient airflow and a current speed of the vehicle; dynamically conducting, in response to the detection, vehicle brake analysis of the sensor data; and dynamically adjust, in response to the vehicle brake analysis and network data that includes one or more of geographic map data, weather data, crowdsourced traffic data, and roadside sign data, a position of the vehicle spoiler air vents to selectively direct ambient airflow directly to the wheel brakes in a manner that selectively cools the wheel brakes.

In accordance with one or more embodiments, an example method of controlling a vehicle having a vehicle spoiler with one or more vehicle spoiler air vents is provided, the method comprising: dynamically detecting a current position of the vehicle spoiler air vents, a current temperature of the wheel brakes, ambient airflow and a current speed of the vehicle; dynamically conducting, in response to the detection, vehicle brake analysis of the sensor data; and dynamically thermally manage, in response to the vehicle brake analysis and network data that includes one or more of geographic map data, weather data, crowdsourced traffic data, and roadside sign data, the wheel brakes by selectively directing ambient airflow to the wheel brakes via the vehicle spoiler air vents in a manner that selectively cools the wheel brakes.

In accordance with one or more embodiments, an example computer program product is provided for a vehicle having a vehicle underbody with one or more vehicle underbody air vents that are moveable between a first position to enhance the aerodynamic performance of the vehicle and a second position to selectively direct ambient airflow to the wheel brakes in a manner that selectively cools the wheel brakes. The example computer program product includes at least one computer readable medium comprising a set of instructions, which when executed by one or more processors, cause the one or more processors to: dynamically detect, as sensor data, a current position of the vehicle underbody air vents, a current temperature of the wheel brakes, ambient airflow and a current speed of the vehicle; dynamically conduct, in response to the detection, vehicle brake analysis of the sensor data; and dynamically control, in response to the vehicle brake analysis and network data that includes one or more of geographic map data, weather data, crowdsourced traffic data, and roadside sign data, the vehicle underbody air vents between the first position and the second position.

In accordance with one or more embodiments, an example computer program product is provided for a vehicle having a vehicle underbody with one or more vehicle underbody air vents. The example computer program product includes at least one computer readable medium comprising a set of instructions, which when executed by one or more processors, cause the one or more processors to dynamically detect, as sensor data, a current position of the vehicle underbody air vents, a current temperature of the wheel brakes, ambient airflow and a current speed of the vehicle; dynamically conduct, in response to the detection, vehicle brake analysis of the sensor data; and dynamically adjust, in response to the vehicle brake analysis and network data that includes one or more of geographic map data, weather data, crowdsourced traffic data, and roadside sign data, a position of the vehicle underbody air vents to selectively direct ambient airflow directly to the wheel brakes in a manner that selectively cools the wheel brakes.

In accordance with one or more embodiments, an example computer program product is provided for a vehicle having a vehicle underbody with one or more vehicle underbody air vents. The example computer program product includes at least one computer readable medium comprising a set of instructions, which when executed by one or more processors, cause the one or more processors to: dynamically detect, as sensor data, a current position of the vehicle underbody air vents, a current temperature of the wheel brakes, ambient airflow and a current speed of the vehicle; dynamically conduct, in response to the detection, vehicle brake analysis of the sensor data; and dynamically thermally manage, in response to the vehicle brake analysis and network data that includes one or more of geographic map data, weather data, crowdsourced traffic data, and roadside sign data, the wheel brakes by selectively directing ambient airflow to the wheel brakes via the vehicle underbody air vents in a manner that selectively cools the wheel brakes.

In accordance with one or more embodiments, an example method of controlling a vehicle is provided, the method comprising: dynamically detecting a current position of one or more vehicle underbody air vents, a current temperature of wheel brakes of the vehicle, ambient airflow and a current speed of the vehicle; dynamically conducting, in response to the detection, vehicle brake analysis of the sensor data; and dynamically controlling, in response to the vehicle brake analysis and network data that includes one or more of geographic map data, weather data, crowdsourced traffic data, and roadside sign data, the vehicle underbody air vents to selectively direct ambient airflow to the wheel brakes in a manner that selectively cools the wheel brakes.

In accordance with one or more embodiments, an example method of controlling a vehicle is provided, the method comprising: dynamically detecting a current position of one or more vehicle underbody air vents, a current temperature of wheel brakes of the vehicle, ambient airflow and a current speed of the vehicle; dynamically conducting, in response to the detection, vehicle brake analysis of the sensor data; and dynamically adjust, in response to the vehicle brake analysis and network data that includes one or more of geographic map data, weather data, crowdsourced traffic data, and roadside sign data, a position of the vehicle underbody air vents to selectively direct ambient airflow directly to the wheel brakes in a manner that selectively cools the wheel brakes.

In accordance with one or more embodiments, an example method of controlling a vehicle having a vehicle underbody with one or more vehicle underbody air vents is provided, the method comprising: dynamically detecting a current position of the vehicle underbody air vents, a current temperature of the wheel brakes, ambient airflow and a current speed of the vehicle; dynamically conducting, in response to the detection, vehicle brake analysis of the sensor data; and dynamically thermally manage, in response to the vehicle brake analysis and network data that includes one or more of geographic map data, weather data, crowdsourced traffic data, and roadside sign data, the wheel brakes by selectively directing ambient airflow to the wheel brakes via the vehicle underbody air vents in a manner that selectively cools the wheel brakes.

In accordance with one or more embodiments, an example computer program product is provided for a vehicle having a vehicle side panel with one or more vehicle side panel air vents that are moveable between a first position to enhance the aerodynamic performance of the vehicle and a second position to selectively direct ambient airflow to the wheel brakes in a manner that selectively cools the wheel brakes. The example computer program product includes at least one computer readable medium comprising a set of instructions, which when executed by one or more processors, cause the one or more processors to: dynamically detect, as sensor data, a current position of the vehicle side panel air vents, a current temperature of the wheel brakes, ambient airflow and a current speed of the vehicle; dynamically conduct, in response to the detection, vehicle brake analysis of the sensor data; and dynamically control, in response to the vehicle brake analysis and network data that includes one or more of geographic map data, weather data, crowdsourced traffic data, and roadside sign data, the vehicle side panel air vents between the first position and the second position.

In accordance with one or more embodiments, an example computer program product is provided for a vehicle having a vehicle side panel with one or more vehicle side panel air vents. The example computer program product includes at least one computer readable medium comprising a set of instructions, which when executed by one or more processors, cause the one or more processors to dynamically detect, as sensor data, a current position of the vehicle side panel air vents, a current temperature of the wheel brakes, ambient airflow and a current speed of the vehicle; dynamically conduct, in response to the detection, vehicle brake analysis of the sensor data; and dynamically adjust, in response to the vehicle brake analysis and network data that includes one or more of geographic map data, weather data, crowdsourced traffic data, and roadside sign data, a position of the vehicle side panel air vents to selectively direct ambient airflow directly to the wheel brakes in a manner that selectively cools the wheel brakes.

In accordance with one or more embodiments, an example computer program product is provided for a vehicle having a vehicle side panel with one or more vehicle side panel air vents. The example computer program product includes at least one computer readable medium comprising a set of instructions, which when executed by one or more processors, cause the one or more processors to: dynamically detect, as sensor data, a current position of the vehicle side panel air vents, a current temperature of the wheel brakes, ambient airflow and a current speed of the vehicle; dynamically conduct, in response to the detection, vehicle brake analysis of the sensor data; and dynamically thermally manage, in response to the vehicle brake analysis and network data that includes one or more of geographic map data, weather data, crowdsourced traffic data, and roadside sign data, the wheel brakes by selectively directing ambient airflow to the wheel brakes via the vehicle side panel air vents in a manner that selectively cools the wheel brakes.

In accordance with one or more embodiments, an example method of controlling a vehicle is provided, the method comprising: dynamically detecting a current position of one or more vehicle side panel air vents, a current temperature of wheel brakes of the vehicle, ambient airflow and a current speed of the vehicle; dynamically conducting, in response to the detection, vehicle brake analysis of the sensor data; and dynamically controlling, in response to the vehicle brake analysis and network data that includes one or more of geographic map data, weather data, crowdsourced traffic data, and roadside sign data, the vehicle side panel air vents to selectively direct ambient airflow to the wheel brakes in a manner that selectively cools the wheel brakes.

In accordance with one or more embodiments, an example method of controlling a vehicle is provided, the method comprising: dynamically detecting a current position of one or more vehicle side panel air vents, a current temperature of wheel brakes of the vehicle, ambient airflow and a current speed of the vehicle; dynamically conducting, in response to the detection, vehicle brake analysis of the sensor data; and dynamically adjust, in response to the vehicle brake analysis and network data that includes one or more of geographic map data, weather data, crowdsourced traffic data, and roadside sign data, a position of the vehicle side panel air vents to selectively direct ambient airflow directly to the wheel brakes in a manner that selectively cools the wheel brakes.

In accordance with one or more embodiments, an example method of controlling a vehicle having a vehicle side panel with one or more vehicle side panel air vents is provided, the method comprising: dynamically detecting a current position/orientation of the vehicle side panel air vents, a current temperature of the wheel brakes, ambient airflow and a current speed of the vehicle; dynamically conducting, in response to the detection, vehicle brake analysis of the sensor data; and dynamically thermally manage, in response to the vehicle brake analysis and network data that includes one or more of geographic map data, weather data, crowdsourced traffic data, and roadside sign data, the wheel brakes by selectively directing ambient airflow to the wheel brakes via the vehicle side panel air vents in a manner that selectively cools the wheel brakes.

BRIEF DESCRIPTION OF THE SEVERAL VIEWS OF THE DRAWINGS

The various advantages of the embodiments of the present disclosure will become apparent to one skilled in the art by reading the following specification and appended claims, and by referencing the following drawings, in which:

DETAILED DESCRIPTION

Figure 1:
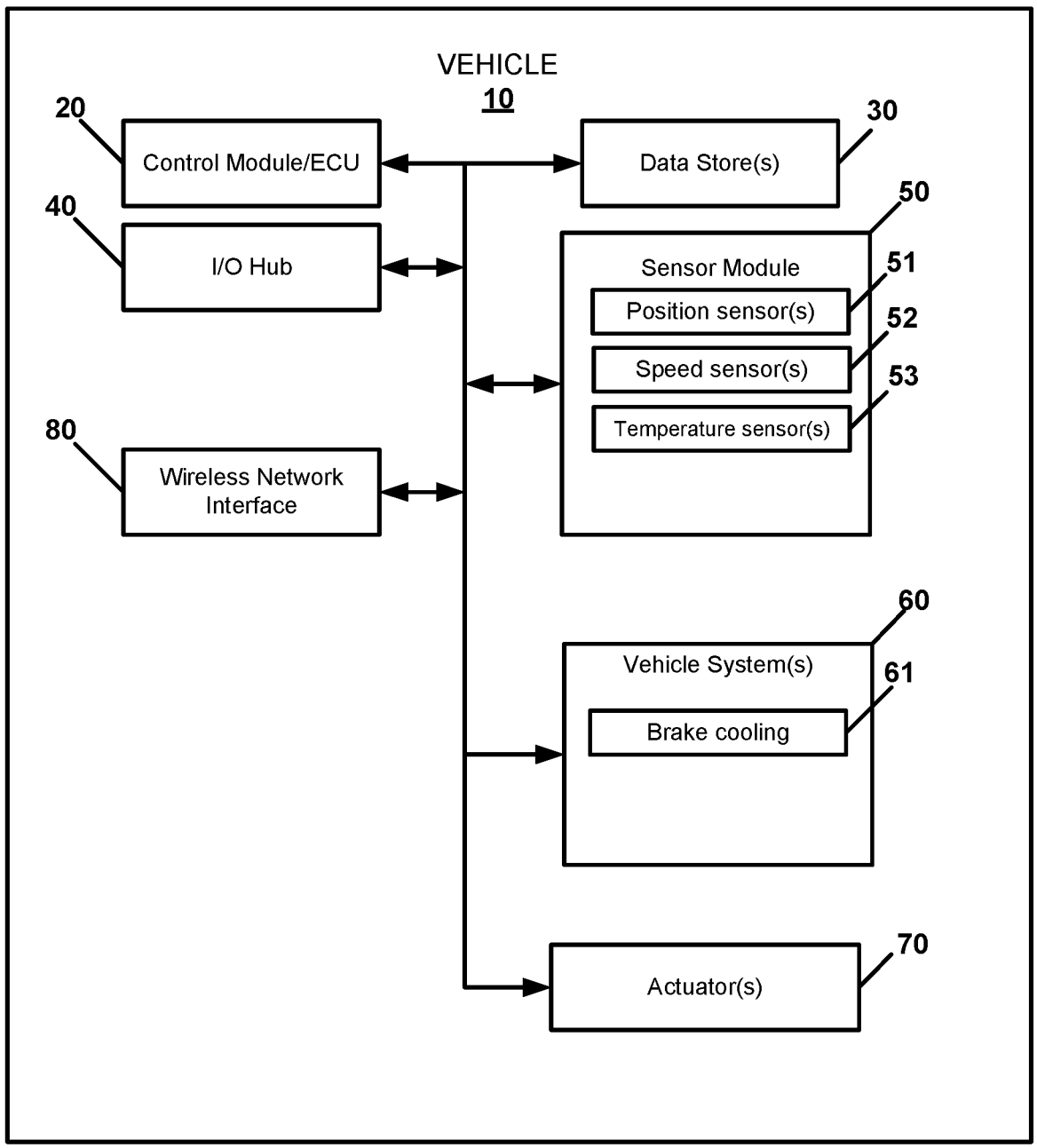
FIG. 1 illustrates a block diagram of an example vehicle, in accordance with one or more embodiments shown and described herein.

Turning to the figures, in which FIGS. 1, 2, 7, 8, and 11-13 respectively illustrate an example vehicle 10 having an example vehicle brake cooling system 61. In accordance with one or more embodiments, the vehicle 10 comprises a mobility-as-a-service (MaaS) vehicle, a car, a truck, a van, a sport utility vehicle, a bus, etc. Embodiments, however, are not limited thereto, and thus, this disclosure contemplates the vehicle 10 comprising any suitable vehicle that falls within the spirit and scope of the principles of this disclosure. For example, the vehicle 10 may comprise a marine vehicle, an air vehicle, a space vehicle, or any other form of transport vehicle.

The vehicle 10 comprises a vehicle body 11 (e.g., chassis, frame, subframe, etc.), vehicle wheels including front vehicle wheels 12a, 12b and corresponding wheel brakes 14a, 14b and rear vehicle wheels 13a, 13b and corresponding wheel brakes 15a, 15b. A vehicle bumper 16 is mounted on the vehicle body 11, and a vehicle spoiler 17 is connected to the vehicle bumper 16.

Vehicle Spoiler Air Vents

In the illustrated embodiments of FIGS. 7 through 10, a vehicle brake cooling system 61 is provided to enhance the aerodynamic performance of the vehicle 10 while also provide active cooling to the wheel brakes (i.e., the front wheel brakes 14a, 14b and the rear wheel brakes 15a, 15b during operation of the vehicle 10. The vehicle spoiler 17 comprises one or more spoiler air vents 18a, 18b that are pivotally connected to a vehicle spoiler housing for pivoting movement about a pivot axis.

In accordance with one or more embodiments, the one or more vehicle spoiler air vents 18a, 18b comprise structural members such as, for example, doors or panels. The vehicle spoiler air vent 18a, 18b are selectively moveable between a closed or first position/orientation to enhance the aerodynamic performance of the vehicle 10 and one or more open or second position/orientations to provide active cooling to the front wheel brakes 14a, 14b and the rear wheel brakes 15a, 15b during operation of the vehicle 10. The spoiler air vents 18a, 18b are selectively moveable to an orientation at an angle that is greater than or equal to 0 degrees and less than or equal to 90 degrees. Meaning, in response to a detected current brake temperature or an estimated (calculated) current brake temperature, the specific orientation of the spoiler air vents 18a, 18b is dynamically variable to correspond to the amount of ambient airflow necessary to actively cool the front wheel brakes 14a, 14b and the rear wheel brakes 15a, 15b to a target brake temperature value that is less than a predetermined threshold brake temperature. The predetermined threshold brake temperature may correspond to the type of material composition of the brake pad. In accordance with one or more embodiments, the detected current brake temperature may comprise an estimated, measured, or calculated brake temperature of each vehicle wheel brake 14a, 14b, 15a, 15b using one or more input values such as, for example, the current ambient temperature, vehicle hardware specs (e.g., corner brake effectiveness), driver inputs (e.g., duration of braking, deceleration, etc.), and current vehicle speed.

Figure 10:
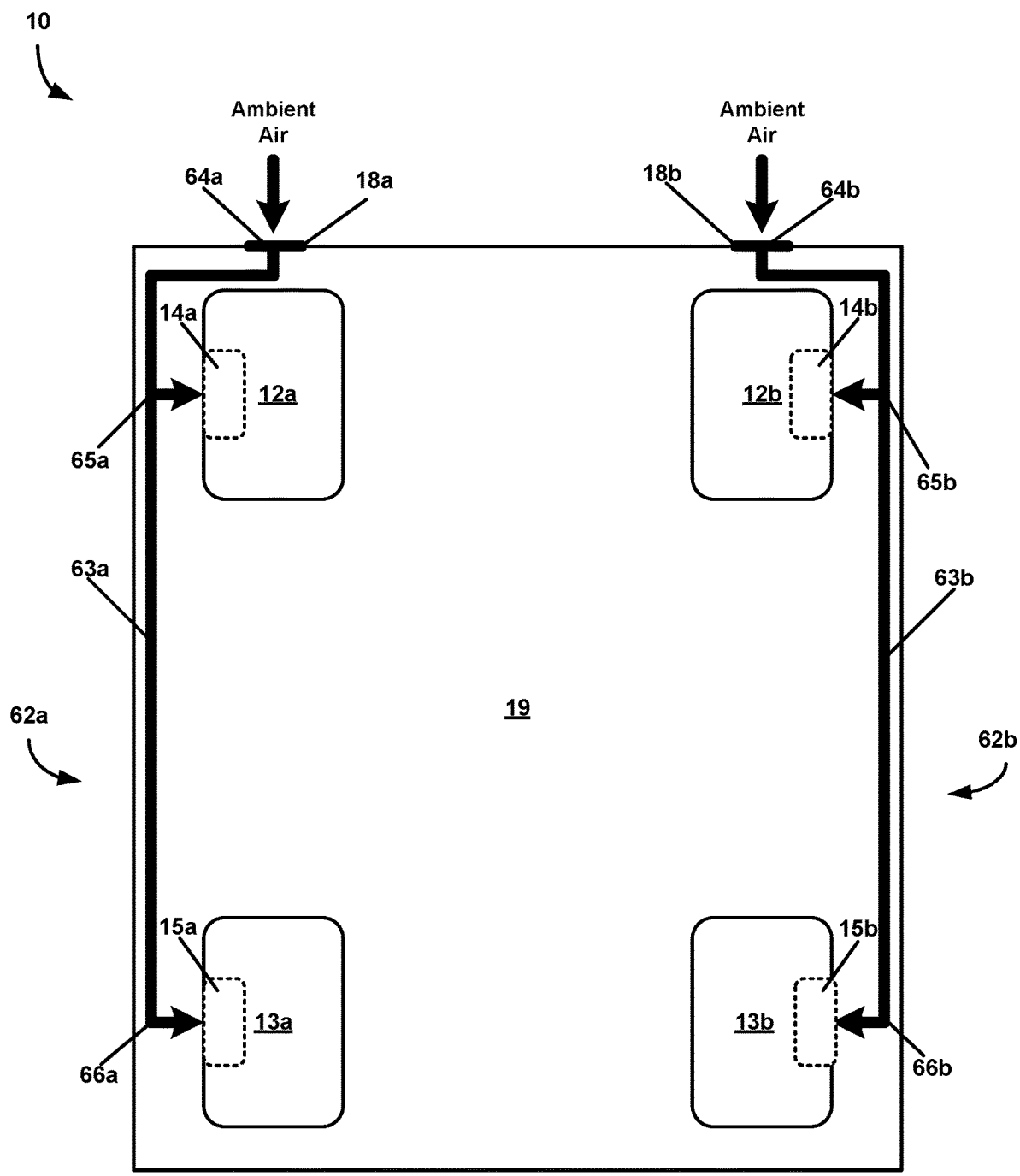
FIGS. 10 through 12 respectively illustrate an example vehicle brake cooling system, in accordance with one or more embodiments shown and described herein.

As illustrated in FIG. 10, the vehicle brake cooling system 61 comprises one or more air channel members 62a, 62b mounted on the vehicle spoiler 17 or under the vehicle underbody 19 to define an air circuit 63a, 63b having air inlets 64a, 64b exposed during movement of the spoiler air vents 18a, 18b to the open or second position/orientation in order to receive ambient airflow. A portion of the ambient airflow is then directed to first air outlets 65a, 65b which in turn directs the ambient airflow to the front wheel brakes 14a, 14b. Another portion of the ambient airflow is directed to second air outlets 66a, 66b which in turn directs the ambient airflow to the rear wheel brakes 15a, 15b. Meaning, in operation of the vehicle 10, in the first position/orientation of the spoiler air vents 18a, 18b, the air inlets 64a, 64b are closed in a manner that substantially restricts entry of ambient air into the one or more air channel members 62a, 62b. The selective movement of the corresponding spoiler shutter members 18a, 18b to the second position/orientation, however, exposes the air inlets 64a, 64b in a manner that facilitates ambient airflow into the one or more air channel members 62a, 62b where the ambient air is directed to the front wheel brakes 14a, 14b and the rear wheel brakes 15a, 15b for the purpose of thermally managing the brakes during operation of the vehicle 10.

Vehicle Underbody Air Vents

Figure 11:
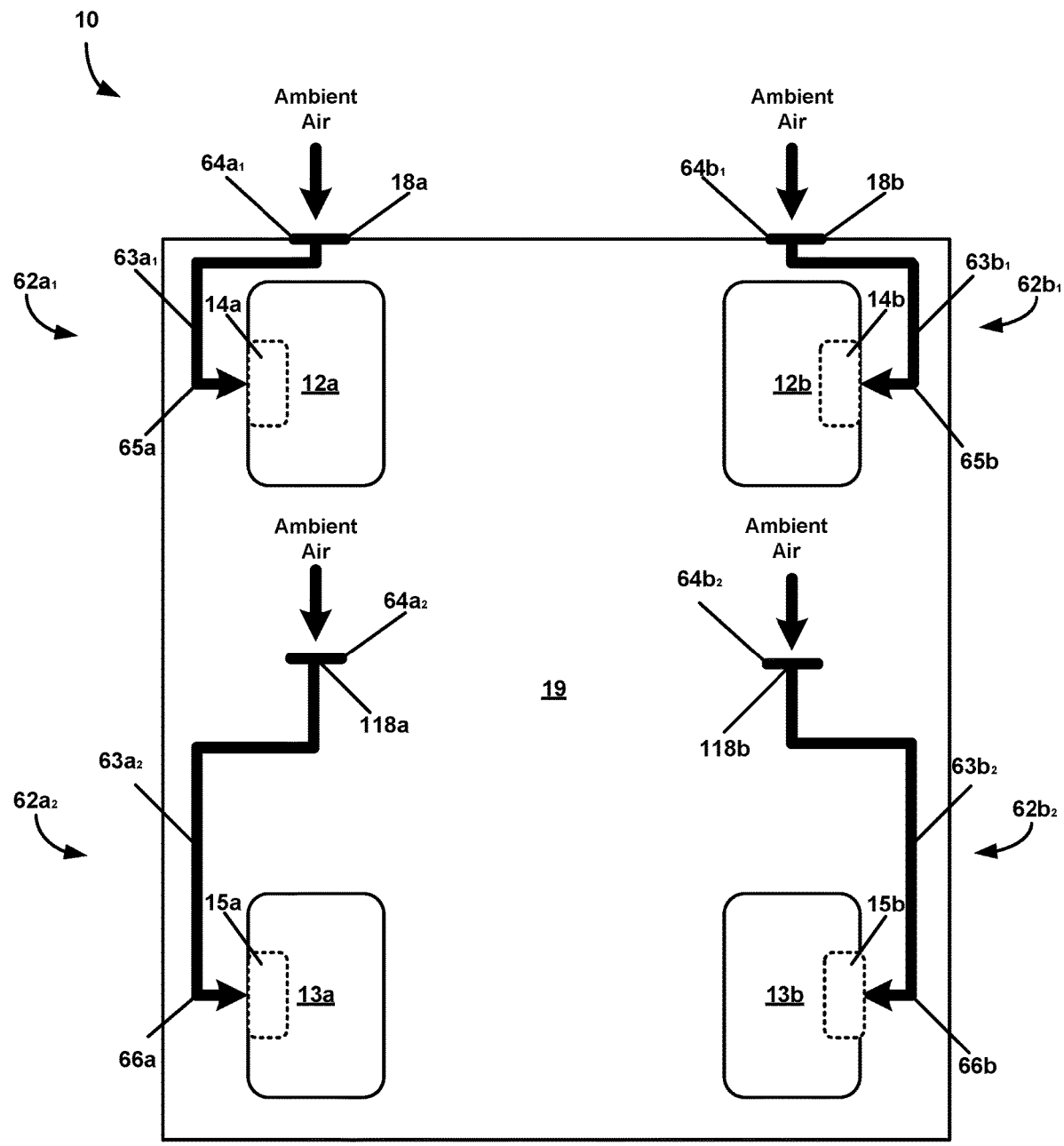

In the illustrated embodiment of FIG. 11, alternatively or additionally, to enhance underbody aerodynamics during operation of the vehicle 10, a vehicle full underfloor, undertray or underbody 19 is provided and comprises one or more underbody air vents 118a, 118b that are pivotally connected to the vehicle underbody 19 for pivoting movement about a pivot axis. In accordance with one or more embodiments, the vehicle underbody 19 has an aerodynamic design that enhances the aerodynamic performance of the vehicle 10 during operation.

In accordance with one or more embodiments, the one or more vehicle underbody air vents 118a, 118b comprise structural members such as, for example, doors or panels. The vehicle underbody air vents 118a, 118b are selectively moveable between a closed or first position/orientation to enhance the aerodynamic performance of the vehicle 10 and one or more open or second positions in a downward direction towards the driving surface to provide active cooling to the rear wheel brakes 15a, 15b during operation of the vehicle 10. The vehicle underbody air vents 118a, 118b are selectively moveable to an orientation at an angle that is greater than or equal to 0 degrees and less than or equal to 90 degrees. Meaning, in response to a detected current brake temperature or an estimated (calculated) current brake temperature, the specific orientation of the vehicle underbody air vents 118a, 118b is dynamically variable to correspond to the amount of ambient airflow necessary to actively cool the rear wheel brakes 15a, 15b to a target brake temperature value that is less than a predetermined threshold brake temperature. The predetermined threshold brake temperature may correspond to the type of material composition of the brake pad. In accordance with one or more embodiments, the detected current brake temperature may comprise an estimated, measured, or calculated brake temperature of each rear wheel brake 15a, 15b using one or more input values such as, for example, the current ambient temperature, vehicle hardware specs (e.g., corner brake effectiveness), driver inputs (e.g., duration of braking, deceleration, etc.), and current vehicle speed.

As further illustrated in FIG. 11, the vehicle brake cooling system 61 comprises one or more first air channel members $63a_1$ defined by or mounted on the vehicle underbody 19 to define a first air circuit $62a_1$ that having a first air inlet $64a_1$ exposed during movement of the one or more vehicle spoiler air vents 18a to the open or second position/orientation in order to receive ambient airflow during operation of the vehicle 10 in a forward vehicle direction. The vehicle brake cooling system 61 also comprises one or more second air channel members $63b_1$ defined by or mounted on the vehicle underbody 19 to define a second air circuit $62b_1$ having a second air inlet $64b_1$ exposed during movement of the one or more vehicle spoiler air vents 18b to the open or second position/orientation in order to receive ambient airflow during operation of the vehicle 10 in a forward vehicle direction. The vehicle brake cooling system 61 further comprises one or more third air channel members $63a_2$ defined by or mounted on the vehicle underbody 19 to define a third air circuit $62a_2$ having a third air inlet $64a_2$ exposed during movement of the one or more vehicle underbody air vents 118a to the open or second position/orientation in order to receive ambient airflow during operation of the vehicle 10 in a forward vehicle direction. The vehicle brake cooling system 61 additionally comprises one or more fourth air channel members $63b_2$ defined by or mounted on the vehicle underbody 19 to define a fourth air circuit $62b_2$ having a fourth air inlet $64b_2$ exposed during movement of the one or more vehicle underbody air vents 118b to the open or second position/orientation in order to receive ambient airflow during operation of the vehicle 10 in a forward vehicle direction.

Meaning, during operation of the vehicle 10 in a forward vehicle direction, in the first position/orientation of the one or more vehicle underbody air vents 118a, 118b, the air inlets $64a_2$, $64b_2$ are closed in a manner that substantially restricts entry of ambient air into the one or more air channel members $62a_2$, $62b_2$. The selective movement of the corresponding underbody air vents 118a, 118b to the second position/orientation, however, exposes the air inlets $64a_2$, $64b_2$ in a manner that facilitates ambient airflow into the one or more air channel members $62a_2$, $62b_2$ where the ambient air is directed to the rear wheel brakes 15a, 15b for the purpose of thermally managing the rear wheel brakes 15a, 15b.

Vehicle Side Panel Air Vents

Figure 12:
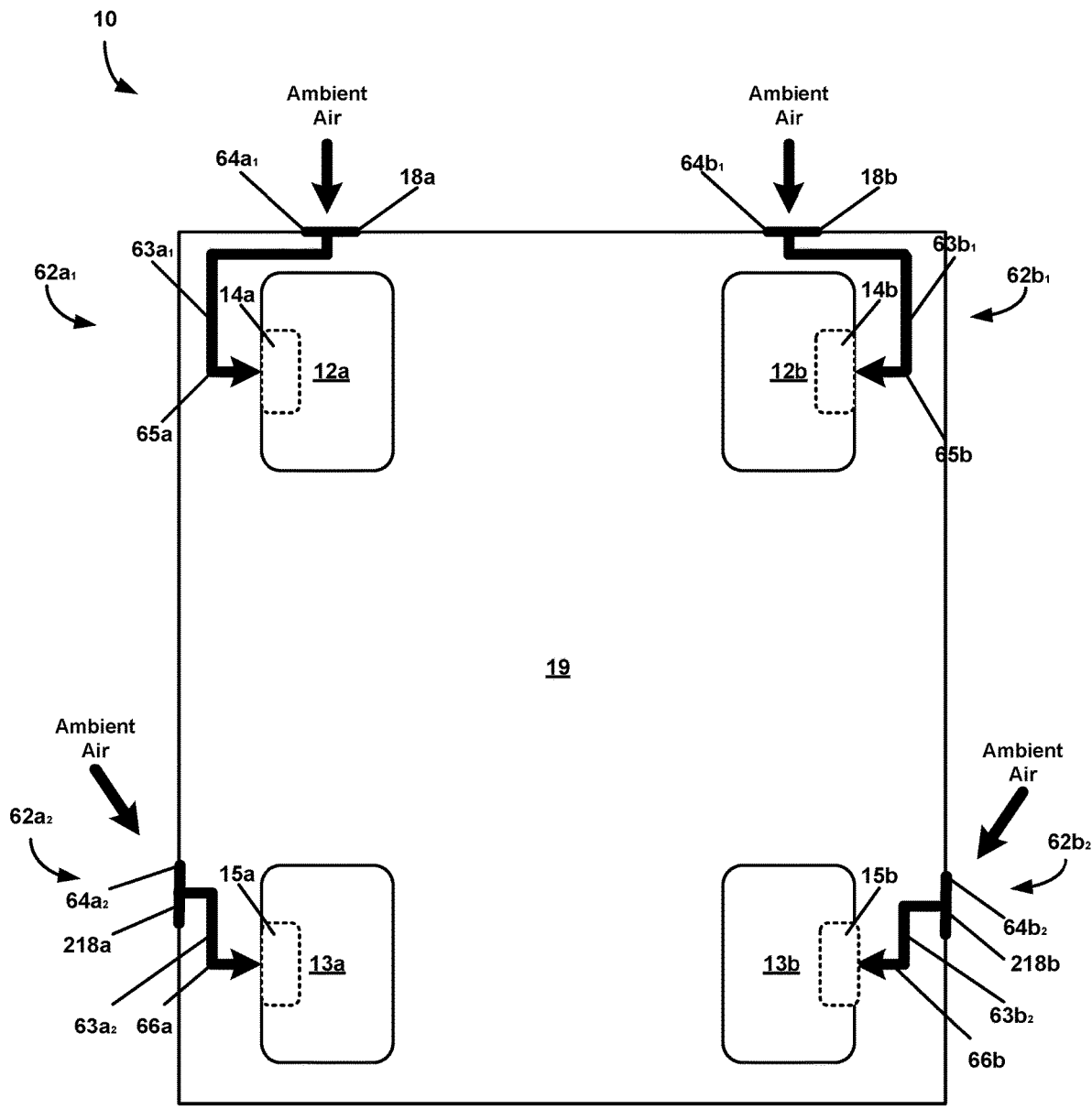

In the illustrated embodiment of FIG. 12, alternatively or additionally, the vehicle body 11, for example, one or more vehicle side panels, comprises one or more vehicle side panel air vents 218a, 218b that are pivotally connected to one or more vehicle side panels of the vehicle body or shell for pivoting movement about a pivot axis. In the illustrated embodiment, the one or more vehicle side panel air vents 218a, 218b are positioned adjacent to the front vehicle wheels 12a, 12b. Embodiments, however, are not limited thereto, and thus, this disclosure contemplates other arrangements such as, for example, positioning the one or more vehicle side panel air vents adjacent to the front vehicle wheels 12a, 12b and the rear vehicle wheels 13a, 13b.

In accordance with one or more embodiments, the one or more vehicle side panel air vents 218a, 218b comprise structural members such as, for example, doors or panels. The vehicle side panel air vents 218a, 218b are selectively moveable between a closed or first position/orientation to enhance the aerodynamic performance of the vehicle 10 and one or more open or second positions in a downward direction towards the driving surface to provide active cooling to the rear wheel brakes 15a, 15b during operation of the vehicle 10. The vehicle side panel air vents 218a, 218b are selectively moveable to an orientation at an angle that is greater than or equal to 0 degrees and less than or equal to 90 degrees. Meaning, in response to a detected current brake temperature or an estimated (calculated) current brake temperature, the specific orientation of the vehicle side panel air vents 218a, 218b is dynamically variable to correspond to the amount of ambient airflow necessary to actively cool the rear wheel brakes 15a, 15b to a target brake temperature value that is less than a predetermined threshold brake temperature. The predetermined threshold brake temperature may correspond to the type of material composition of the brake pad. In accordance with one or more embodiments, the detected current brake temperature may comprise an estimated, measured, or calculated brake temperature of each rear wheel brake 15a, 15b using one or more input values such as, for example, the current ambient temperature, vehicle hardware specs (e.g., corner brake effectiveness), driver inputs (e.g., duration of braking, deceleration, etc.), and current vehicle speed.

As further illustrated in FIG. 12, the vehicle brake cooling system 61 comprises one or more first air channel members $63a_1$ defined by or mounted on the vehicle underbody 19 to define a first air circuit $62a_1$ that having a first air inlet $64a_1$ exposed during movement of the one or more vehicle spoiler air vents 18a to the open or second position/orientation in order to receive ambient airflow during operation of the vehicle 10 in a forward vehicle direction. The vehicle brake cooling system 61 also comprises one or more second air channel members $63b_1$ defined by or mounted on the vehicle underbody 19 to define a second air circuit $62b_1$ having a second air inlet $64b_1$ exposed during movement of the one or more vehicle spoiler air vents 18b to the open or second position/orientation in order to receive ambient airflow during operation of the vehicle 10 in a forward vehicle direction. The vehicle brake cooling system 61 further comprises one or more third air channel members $63a_2$ defined by or mounted on the vehicle underbody 19 to define a third air circuit $62a_2$ having a third air inlet $64a_2$ exposed during movement of the one or more vehicle side panel air vents 218a to the open or second position/orientation in order to receive ambient airflow during operation of the vehicle 10 in a forward vehicle direction. The vehicle brake cooling system 61 additionally comprises one or more fourth air channel members $63b_2$ defined by or mounted on the vehicle underbody 19 to define a fourth air circuit $62b_2$ having a fourth air inlet $64b_2$ exposed during movement of the one or more vehicle side panel air vents 218b to the open or second position/orientation in order to receive ambient airflow during operation of the vehicle 10 in a forward vehicle direction.

Meaning, during operation of the vehicle 10 in a forward vehicle direction, in the first position/orientation of the one or more vehicle side panel air vents 218a, 218b, the air inlets $64a_2$, $64b_2$ are closed in a manner that substantially restricts entry of ambient air into the one or more air channel members $62a_2$, $62b_2$. The selective movement of the corresponding side panel air vents 218a, 218b to the second position/orientation, however, exposes the air inlets $64a_2$, $64b_2$ in a manner that facilitates ambient airflow into the one or more air channel members $62a_2$, $62b_2$ where the ambient air is directed to the rear wheel brakes 15a, 15b for the purpose of thermally managing the rear wheel brakes 15a, 15b.

In accordance with one or more embodiments, the vehicle brake cooling system 61 comprises a control module 20 that serves as a host, main, or primary control system of the vehicle 10. For example, the control module 20 may comprise an electronic or engine control unit (ECU). The control module 20 may comprise one or more processors 21. As set forth, described, and/or illustrated herein, "processor" means any component or group of components that are configured to execute any of the processes described herein or any form of instructions to carry out such processes or cause such processes to be performed. The processors 21 may be implemented with one or more general-purpose and/or one or more special-purpose processors. Examples of suitable processors include graphics processors, microprocessors, microcontrollers, DSP processors, and other circuitry that may execute software (e.g., stored on a non-transitory computer-readable medium). Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processors 21 may comprise at least one hardware circuit (e.g., an integrated circuit) configured to carry out instructions contained in program code. In embodiments in which there is a plurality of processors 21, such processors 21 may work independently from each other, or one or more processors may work in combination with each other.

In accordance with one or more embodiments, the vehicle 10 comprises an I/O hub 40 operatively connected to other systems and subsystems of the vehicle 10. The I/O hub 40 may comprise an input interface and an output interface. The input interface and the output interface may be integrated as a single, unitary interface, or alternatively, be separate as independent interfaces that are operatively connected.

In one or more embodiments, the input interface may be used by a user, such as, for example, an operator vehicle operator, driver, or remote operator of the vehicle 10, to input one or more data input signals relating to operation of the vehicle 10. The input interface is defined herein as any device, component, system, subsystem, element, or arrangement or groups thereof that enable information/data to be entered in a machine. The input interface may receive an input from the vehicle operator, driver, or remote operator of the vehicle 10. In an example, the input interface may comprise a user interface (UI), graphical user interface (GUI) such as, for example, a display, human-machine interface (HMI), or the like. Embodiments, however, are not limited thereto, and thus, this disclosure contemplates the input interface comprising any suitable configuration that falls within the spirit and scope of the principles of this disclosure. For example, the input interface may comprise a keypad, toggle switch, touch screen, multi-touch screen, button, joystick, mouse, trackball, microphone and/or combinations thereof.

The output interface is defined herein as any device, component, system, subsystem, element, or arrangement or groups thereof that enable information/data to be presented to the vehicle operator and/or a remote operator of the vehicle 10. The output interface may be configured to present information/data to the vehicle occupant and/or the remote operator. The output interface may comprise one or more of a visual display or an audio display such as a microphone, earphone, and/or speaker. One or more components of the vehicle 10 may serve as both a component of the input interface and a component of the output interface.

In accordance with one or more embodiments, the vehicle spoiler system 100 comprises one or more data stores 30 for storing one or more types of data. The vehicle spoiler system 100 may include interfaces that enable one or more systems thereof to manage, retrieve, modify, add, or delete, the data stored in the data stores 30. The data stores 30 may comprise volatile and/or non-volatile memory. Examples of suitable data stores 30 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data stores 30 may be a component of the processors 21, or alternatively, may be operatively connected to the processors 21 for use thereby. As set forth, described, and/or illustrated herein, "operatively connected" may include direct or indirect connections, including connections without direct physical contact.

In accordance with one or more embodiments, the vehicle spoiler system 100 comprises a sensor module 50 configured to, at least during operation of the vehicle 10, dynamically detect, capture, determine, assess, monitor, measure, quantify, and/or sense one or more operational features of the vehicle 10, such as, for example, vehicle speed, air vent position/orientation, brake temperature, etc. As set forth, described, and/or illustrated herein, "sensor" means any device, component, system, and/or subsystem that can perform one or more of detecting, determining, assessing, monitoring, measuring, quantifying, and sensing something. The one or more sensors may be configured to detect, determine, assess, monitor, measure, quantify and/or sense in real-time. As set forth, described, and/or illustrated herein, "real-time" means a level of processing responsiveness that a user, system, or subsystem senses as sufficiently immediate for a particular process or determination to be made, or that enables the processor to keep up with some external process.

In accordance with one or more embodiments, operation of the control module 20 may be implemented as computer readable program code that, when executed by a processor, implement one or more of the various processes set forth, described, and/or illustrated herein. The control module 20 may be a component of the processors 21, or alternatively, may be executed on and/or distributed among other processing systems to which the processors 21 are operatively connected. The control module 20 may include a set of logic instructions executable by the processors 21. Alternatively or additionally, the data stores 30 may contain such logic instructions. The logic instructions may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 2:
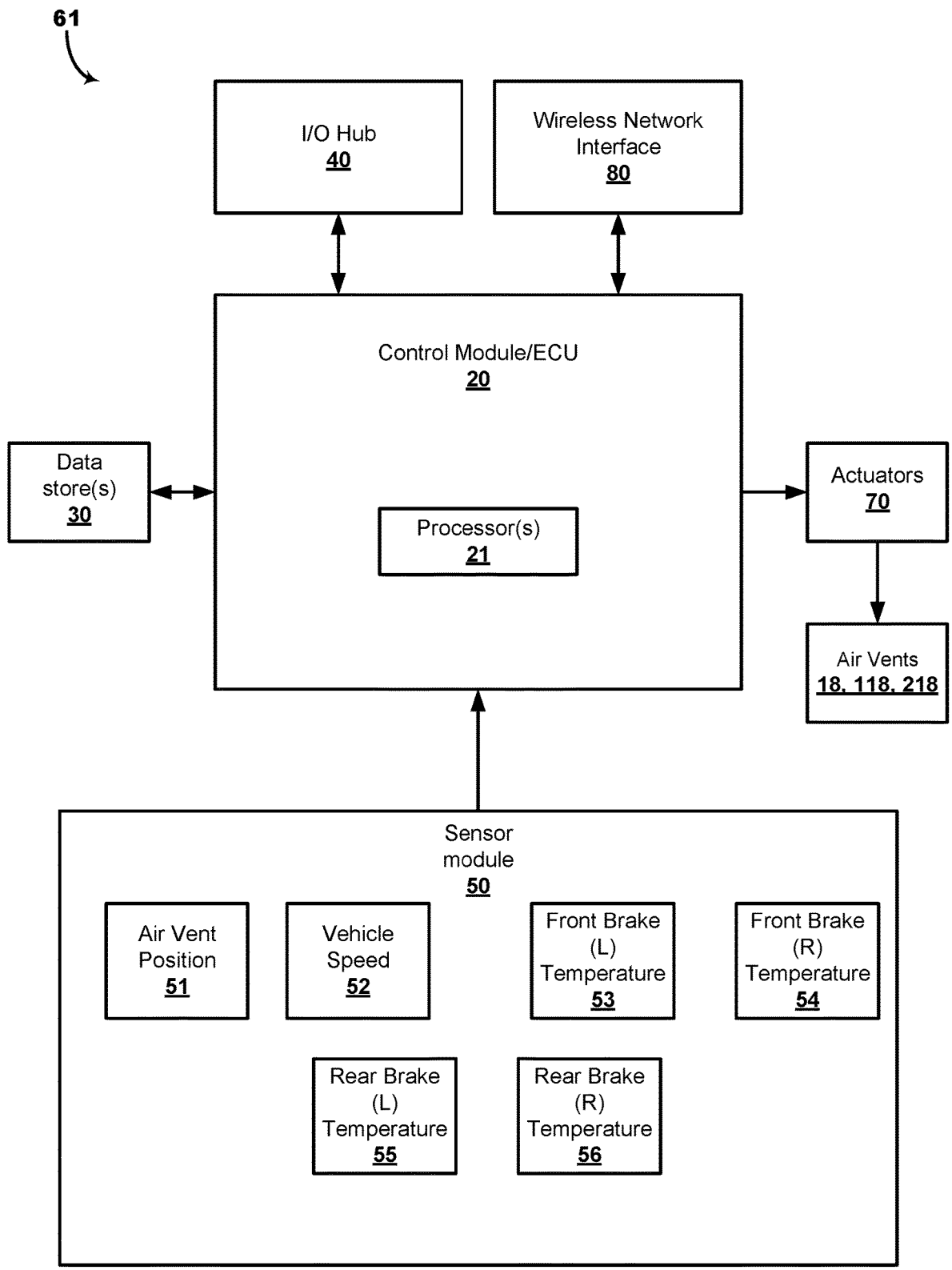
FIG. 2 illustrates a block diagram of an example vehicle spoiler system, in accordance with one or more embodiments shown and described herein.
Figure 3:
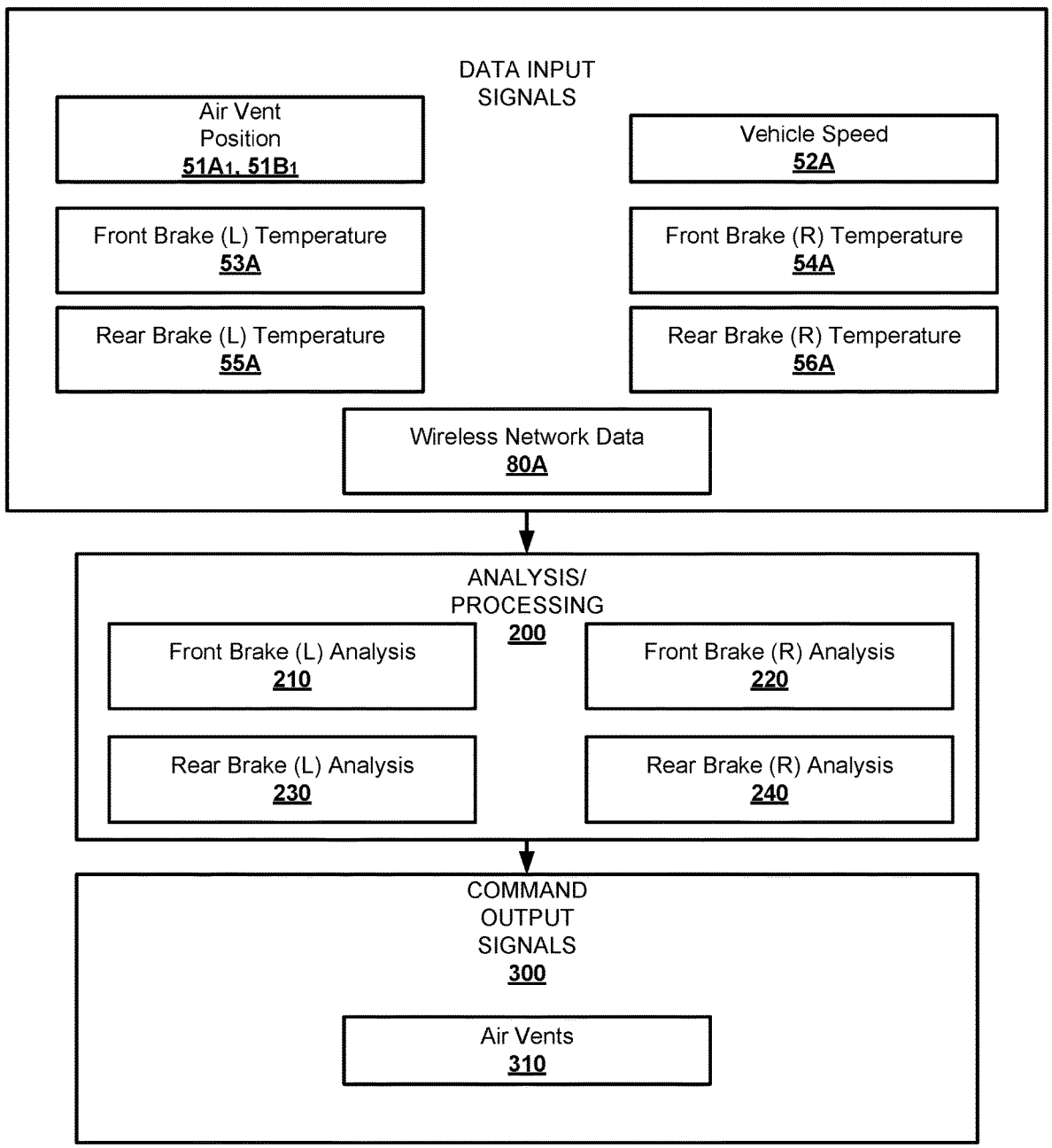
FIG. 3 illustrates a diagram of one or more vehicle control blocks, in accordance with one or more embodiments shown and described herein.

In the illustrated one or more embodiments of FIGS. 2 and 3, the control module 20 may be configured to facilitate, via the sensor module 50, dynamic detection (as sensor data) of a current position/orientation of the air vents 18*a*, 18*b*, 118*a*, 118*b*, 218*a*, 218*b* of the vehicle brake cooling system 61, a current speed of the vehicle 10, and a current temperature of each vehicle wheel brake 14*a*, 14*b*, 15*a*, 15*b*. The control module 20 may be configured to detect the current temperature based on an estimated, measured, or calculated brake temperature of each vehicle wheel brake 14*a*, 14*b*, 15*a*, 15*b* using one or more input values such as, for example, the current ambient temperature, vehicle hardware specs (e.g., corner brake effectiveness), driver inputs (e.g., duration of braking, deceleration, etc.), and current vehicle speed. The captured sensor data and other related values to estimate, measure, or calculate the brake temperature may be located in a vehicle database of the data stores 30 or an external source (e.g., cloud-based data store(s)).

In accordance with one or more embodiments, one or more of the modules 20, 50 set forth, described, and/or illustrated herein may include artificial or computational intelligence elements, e.g., neural network, fuzzy logic, or other machine learning algorithms.

In accordance with one or more embodiment, one or more of the control module 20 and the one or more of the processors 21 are operatively connected to communicate with the vehicle brake cooling system 61 and/or individual components thereof. For example, as illustrated in FIG. 3, the one or more of the processors 21 are in communication to send or transmit one or more command output signals 310, and/or receive data input signals 51A, 52A, 53A, 54A, 55A, and 56A from the I/O hub 40, and the sensor module 50 to dynamically control the vehicle brake cooling system 61 in a manner that achieves both enhanced vehicle aerodynamic performance and active brake cooling.

The vehicle 10 may comprise one or more actuators 70 operatively connected (e.g., via wire and/or wireless communication) to the control module 20. The actuators 70, which may be any element or combination of elements configured to modify, adjust and/or alter operation of the vehicle brake cooling system 61 and components thereof in response to receiving command output signals 300 or other inputs from the one or more of the processors 21. In accordance with one or more embodiments, the actuators 70 comprise a mechanical actuator or an electrical actuator that is operatively connected to the air vents 18, 118, 218. Embodiments, however, are not limited thereto, and thus, this disclosure contemplates the actuators 70 comprising any suitable configuration that falls within the spirit and scope of the principles of this disclosure. For example, such suitable actuator configuration may comprise motors, pneumatic actuators, hydraulic actuators, thermal actuators, magnetic actuators, mechanical actuators, relays, and/or piezoelectric actuators, etc.

In accordance with one or more embodiments, the sensor module 50 comprises one or more inductive air vent position/orientation sensors 51, vehicle speed sensors 52, and vehicle brake temperature sensors 53, 54, 55, and 56 operatively connected to the one or more processors 21, the data stores 30, and/or other elements, components, modules, systems, and subsystems of the vehicle 10. Embodiments, however, are not limited thereto. This disclosure contemplates the sensor module 50 comprising any suitable sensor architecture that permits practice of the one or more embodiments.

In the illustrated embodiment of FIG. 10, the inductive air vent position/orientation sensors 51 comprise a left spoiler air vent position/orientation sensor 51A and a right spoiler air vent position/orientation sensor 51B that are spatially arranged on, in close spatial proximity to, or adjacent to a corresponding spoiler air vents 18a, 18b to dynamically detect, determine, assess, monitor, measure, quantify, as sensor data, one or more operational features of the spoiler air vents 18a, 18b. Such operational features include, but are not limited to, the current position, spatial orientation, or state of the spoiler air vents 18a, 18b. The one or more inductive air vent position/orientation sensors 51 (i.e., the left spoiler air vent position/orientation sensor 51A and the right spoiler air vent position/orientation sensor 51B) may work independently from each other, or alternatively, may work in combination with each other. The one or more inductive air vent position/orientation sensors 51 (i.e., the left spoiler air vent position/orientation sensor 51A and the right spoiler air vent position/orientation sensor 51B) may be used in any combination, and may be used redundantly to validate and improve the accuracy of the detection.

In the illustrated embodiment of FIG. 11, the inductive air vent position/orientation sensors 51 comprise a left underbody air vent position/orientation sensor 51A and a right underbody air vent position/orientation sensor 51B that are spatially arranged on, in close spatial proximity to, or adjacent to a corresponding underbody air vents 118a, 118b to dynamically detect, determine, assess, monitor, measure, quantify, as sensor data, one or more operational features of the underbody air vents 118a, 118b. Such operational features include, but are not limited to, the current position, spatial orientation, or state of the underbody air vents 118a, 118b. The one or more inductive air vent position/orientation sensors 51 (i.e., the left underbody air vent position/orientation sensor 51A and the right underbody air vent position/orientation sensor 51B) may work independently from each other, or alternatively, may work in combination with each other. The one or more inductive air vent position/orientation sensors 51 (i.e., the left underbody air vent position/orientation sensor 51A and the right underbody air vent position/orientation sensor 51B) may be used in any combination, and may be used redundantly to validate and improve the accuracy of the detection.

In the illustrated embodiment of FIG. 12, the inductive air vent position/orientation sensors 51 comprise a left side panel air vent position/orientation sensor 51A and a right side panel air vent position/orientation sensor 51B that are spatially arranged on, in close spatial proximity to, or adjacent to a corresponding side panel air vents 218a, 218b to dynamically detect, determine, assess, monitor, measure, quantify, as sensor data, one or more operational features of the side panel air vents 218a, 218b. Such operational features include, but are not limited to, the current position, spatial orientation, or state of the side panel air vents 218a, 218b. The one or more inductive air vent position/orientation sensors 51 (i.e., the left side panel air vent position/orientation sensor 51A and the right side panel air vent position/orientation sensor 51B) may work independently from each other, or alternatively, may work in combination with each other. The one or more inductive air vent position/orientation sensors 51 (i.e., the left side panel air vent position/orientation sensor 51A and the right side panel air vent position/orientation sensor 51B) may be used in any combination, and may be used redundantly to validate and improve the accuracy of the detection.

The one or more vehicle speed sensors 52 are spatially arranged on, in close spatial proximity to, or adjacent to one or more of the vehicle left wheel and the vehicle right wheel to dynamically detect, determine, assess, monitor, measure, quantify, as sensor data, the current speed of the vehicle 10 based on the wheel speed of one or more of the wheel and the rear wheel. The one or more vehicle speed sensors 52 may work independently from each other, or alternatively, may work in combination with each other. The one or more vehicle speed sensors 52 may be used in any combination, and may be used redundantly to validate and improve the accuracy of the detection.

The one or more vehicle brake temperature sensors, comprising a left front vehicle brake temperature sensor 53, a right front vehicle brake temperature sensor 54, a left rear vehicle brake temperature sensor 55, and a right rear vehicle brake temperature sensor 56 are spatially arranged on, in close spatial proximity to, or adjacent to one or more of the left vehicle wheel brake 13*a* and the vehicle right wheel brake 13*b* to dynamically detect, determine, assess, monitor, measure, quantify, as sensor data, the current brake temperature of the left vehicle wheel brake 13*a* and the right vehicle wheel brake 13*b* during operation of the vehicle 10. In one or more example embodiments, the left vehicle brake temperature sensor 53, the right vehicle brake temperature sensor 54, the left rear vehicle brake temperature sensor 55, and the right rear vehicle brake temperature sensor 56 respectively comprise a thermocouple. Embodiments, however, are not limited thereto, and thus, this disclosure contemplates the brake temperature sensors comprising any suitable sensor architecture that permits practice of the one or more embodiments. The left vehicle brake temperature sensor 53, the right vehicle brake temperature sensor 54, the left rear vehicle brake temperature sensor 55, and the right rear vehicle brake temperature sensor 56 may work independently from each other, or alternatively, may work in combination with each other. The left vehicle brake temperature sensor 53, the right vehicle brake temperature sensor 54, the left rear vehicle brake temperature sensor 55, and the right rear vehicle brake temperature sensor 56 may be used in any combination, and may be used redundantly to validate and improve the accuracy of the detection.

In accordance with one or more embodiments, the control module 20 is to receive one or more data signals 51A$_1$, 51B$_1$, 52A, 53A, 54A, 55A, and 56A from the sensor module 50, and in response thereto, the one or more processors 21 are to conduct an analysis 200, including, but not limited to, a vehicle brake analysis 210 of the front vehicle wheel brakes 14*a*, 14*b*, and a vehicle brake analysis 220 for the rear vehicle wheel brakes 15*a*, 15*b*.

In accordance with one or more embodiments, the control module 20 is configured to receive one or more data signals 80A via a wireless network interface 80. The wireless network interface 80 is configured to facilitate wireless communication between the vehicle 10 and one or more external source devices. In one or more example embodiments, the control module 20 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or a combination thereof. Embodiments, however, are not limited thereto, and thus, this disclosure contemplates any suitable other suitable wireless network architecture that permits practice of the one or more embodiments.

The wireless network data comprises data communicated to the vehicle 10 from sources external to the vehicle 10. Such externally sourced data comprises, but is not limited to, one or more of geographic map data, weather data, crowd-sourced traffic data, and roadside sign data. Accordingly, the control module 20 is configured to receive information from one or more other external source devices to the and process the received information. Information may be received based on preferences including but not limited to location (e.g., as defined by geography from address, zip code, or GPS coordinates), planned travel routes (e.g., global position system (GPS) alerts), activity associated with co-owned/shared vehicles, history, news feeds, and the like. The information (i.e., received or processed information) may also be uplinked to other systems and modules in the vehicle 10 for further processing to discover additional information that may be used to enhance the understanding of the information. The control module 20 may also send information to other vehicles in a detected driving environment, and link to other devices, including but not limited to smart phones, smart home systems, or Internet-of-Things (IoT) devices. In one or more example embodiments, the geographic location is the current geographic location of the vehicle 10 that is determined further based on GPS data associated with the vehicle 10. In another example, the geographic location is a future geographic location of the vehicle 10 that is determined further based on navigation route (e.g., high definition/HD map) data.

In accordance with one or more embodiments, in response to the vehicle brake analysis and the wireless network data, the one or more processors 21 are to execute the set of instructions to control the vehicle brake cooling system 61 (e.g., one or more of the left spoiler shutter 63*a* and the right spoiler shutter 63*b*) by sending one or more command output signals 310 to the actuators 70 in order to selectively control the vehicle spoiler 63 (e.g., one or more of the left spoiler shutter 63*a* and the right spoiler shutter 63*b*) between a first position/orientation to enhance the aerodynamic performance of the vehicle and a second position/orientation to selectively direct ambient airflow to a corresponding one of the wheel brakes 13*a*, 13*b* in a manner that selectively cools the vehicle wheel brakes 13*a*, 13*b*.

Alternatively or additionally, the one or more processors 21, in response to the vehicle brake analysis and the wireless network data, are to execute the set of instructions to control the vehicle spoiler system 61 in a manner that moves or adjusts the left spoiler shutter 63*a* and the right spoiler shutter 63*b* independently of each other, or simultaneously.

Alternatively or additionally, the one or more processors 21, in response to the vehicle brake analysis and the wireless network data, are to execute the set of instructions to control the vehicle spoiler system 61 by sending one or more command output signals 310 to the actuators 70 in order to adjust a position/orientation of the vehicle spoiler (e.g., one or more of the left spoiler shutter 63*a* and the right spoiler shutter 63*b*) to selectively direct ambient airflow directly to the wheel brakes 13*a*, 13*b* in a manner that selectively cools the wheel brakes 13*a*, 13*b*.

Alternatively or additionally, the one or more processors 21, in response to the vehicle brake analysis and the wireless network data, are to execute the set of instructions to control the vehicle spoiler system 61 by sending one or more command output signals 310 to the actuators 70 in order to thermally manage the wheel brakes by selectively directing ambient airflow thereto in a manner that selectively cools the wheel brakes 13*a*, 13*b*.

In one or more example embodiments, the one or more processors 21 are configured to compare the detected current temperature of the wheel brakes 13*a*, 13*b* to the predetermined threshold temperature. The one or more processors 21 are configured to dynamically control the vehicle spoiler 63 (e.g., one or more of the left spoiler shutter 63*a* and the right spoiler shutter 63*b*) by moving the vehicle spoiler 63 (e.g., one or more of the left spoiler shutter 63*a* and the right spoiler shutter 63*b*) to the second position/orientation when the detected current temperature is greater than the predetermined threshold temperature. Then, when the detected current temperature is less than the predetermined threshold temperature, the one or more processors 21 are configured to dynamically control the vehicle spoiler 63 (e.g., one or more of the left spoiler shutter 63*a* and the right spoiler shutter 63*b*) by returning the vehicle spoiler 63 (e.g., one or more of the left spoiler shutter 63a and the right spoiler shutter 63b) to the first position/orientation.

In one or more example embodiments, the one or more processors 21 are to execute the set of instructions to automatically move one or more of the vehicle spoiler 63, the left spoiler shutter 63a, and the right spoiler shutter 63b to one or more second positions at a predetermined vehicle speed. Then, one or more of the vehicle spoiler 63, the left spoiler shutter 63a, and the right spoiler shutter 63b are automatically pivoted firstly by force of gravity at a predetermined rate of vehicle acceleration.

Figure 4:
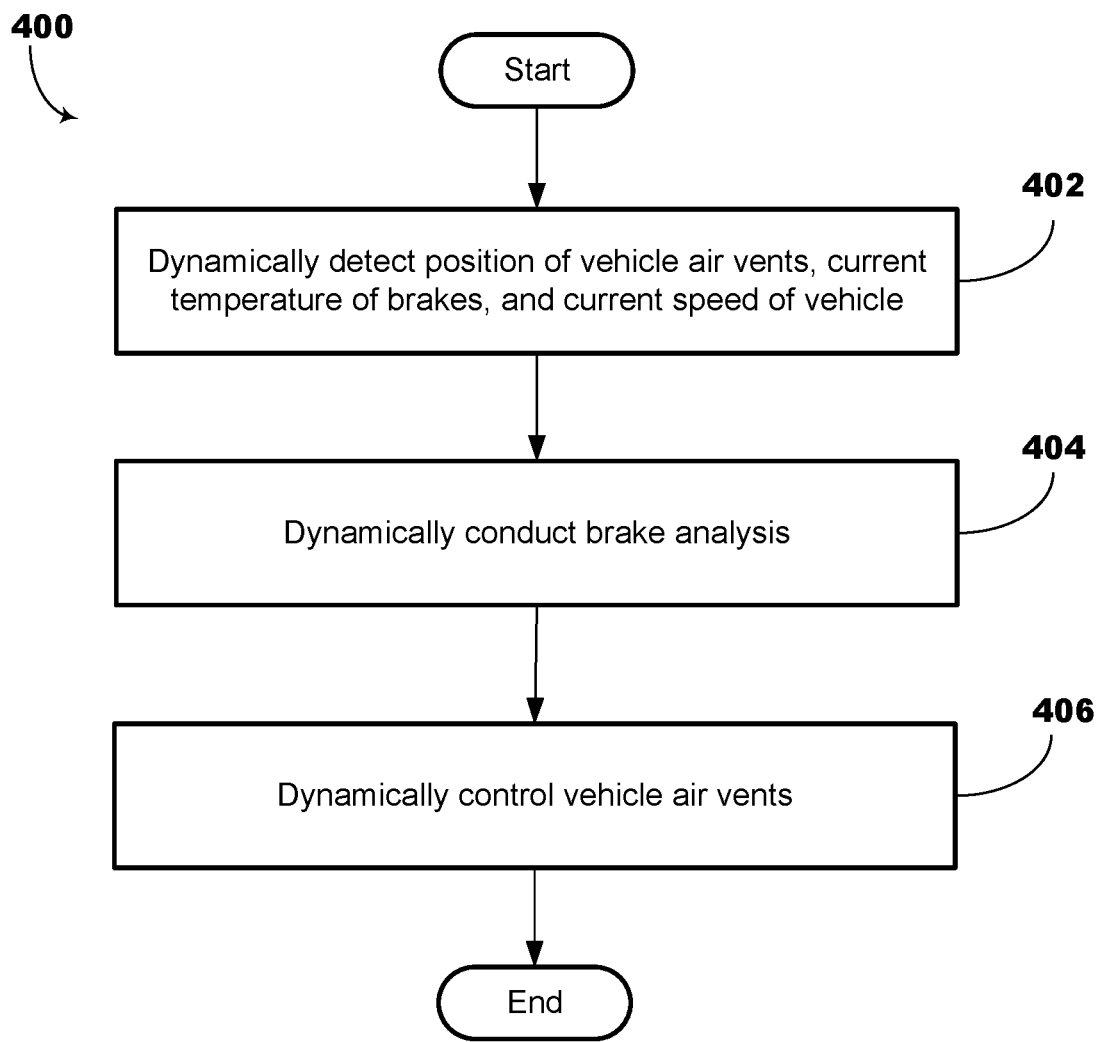
FIGS. 4 through 6 respectively illustrate a schematic diagram of example methods of controlling a vehicle, in accordance with one or more embodiments shown and described herein.
Figure 5:
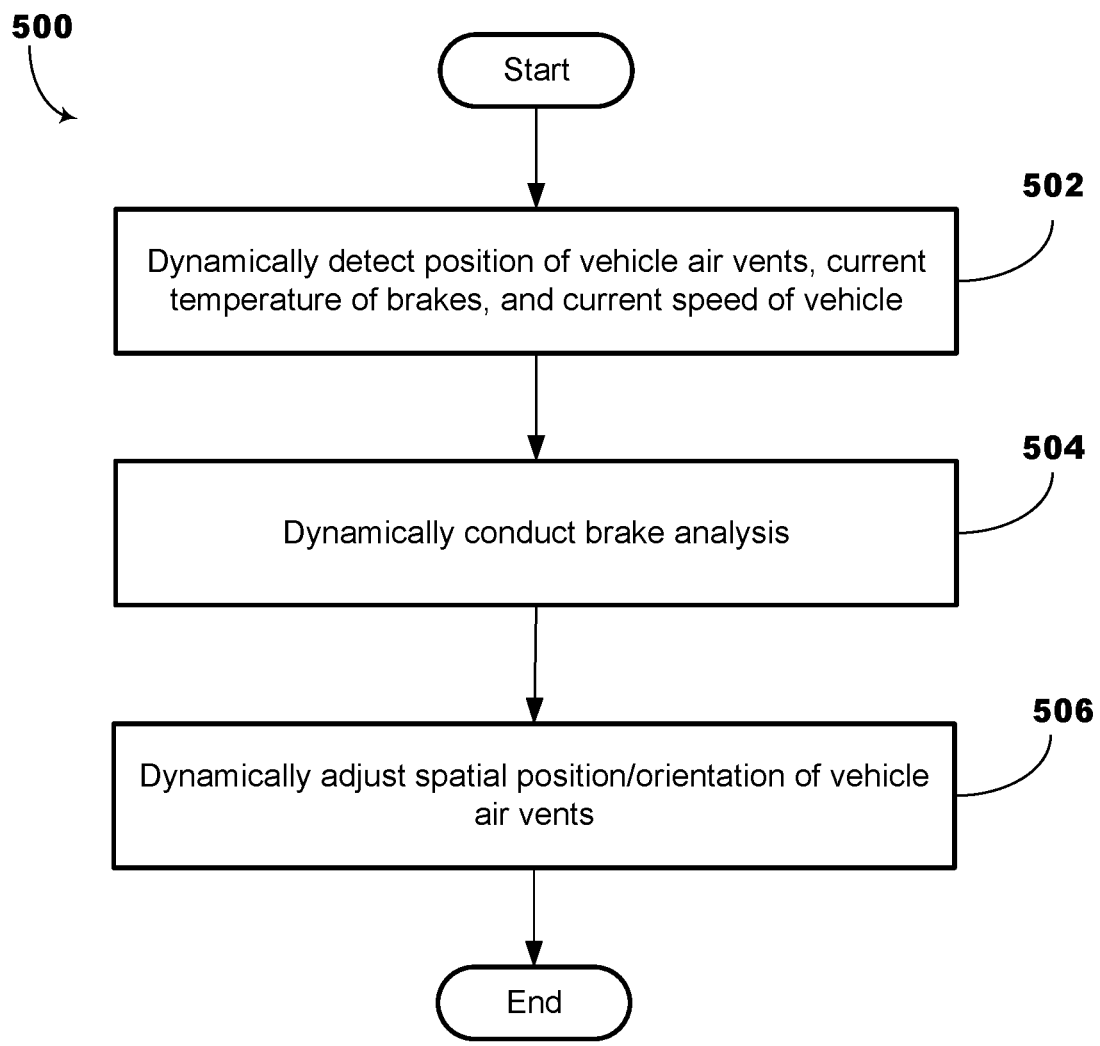
Figure 6:
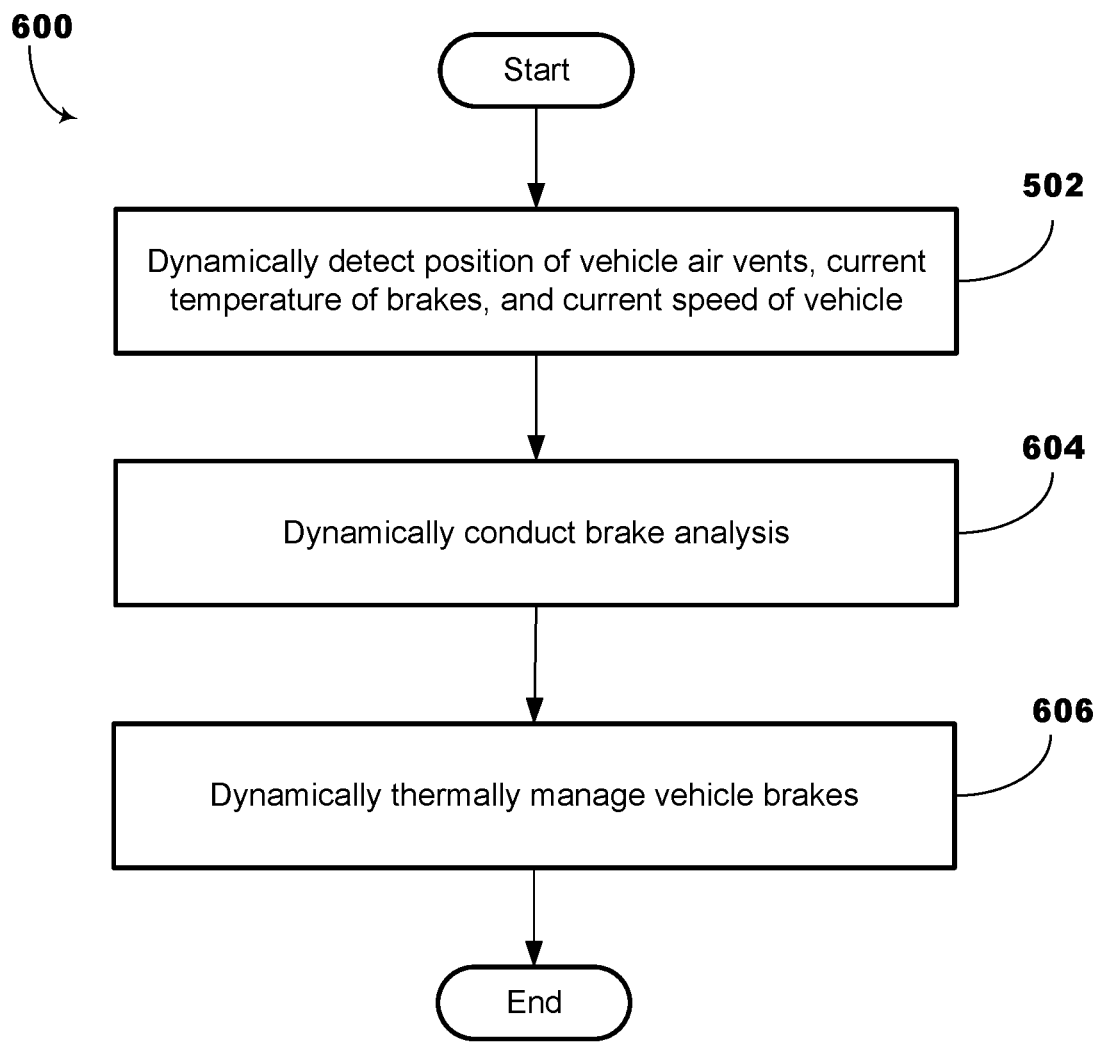
Figure 7:
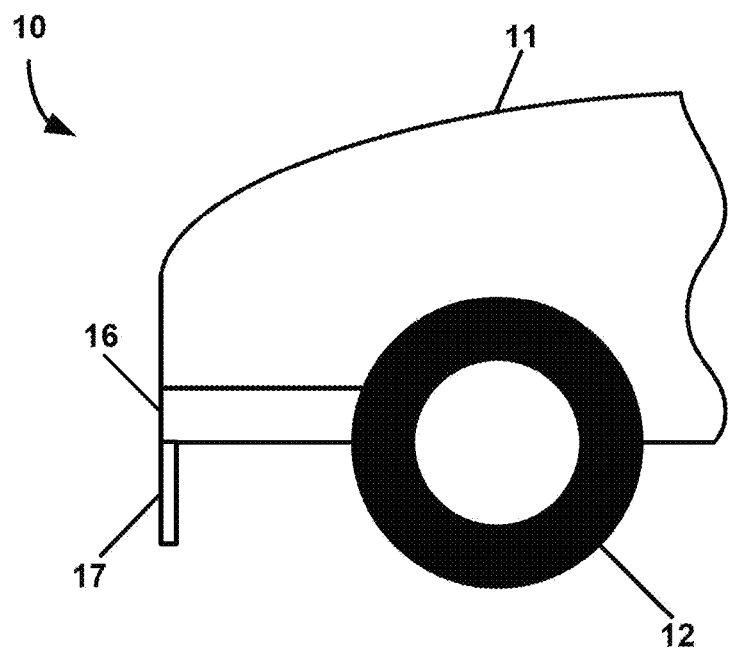
FIGS. 7 and 8 respectively illustrates an example vehicle and vehicle spoiler system, in accordance with one or more embodiments shown and described herein.
Figure 8:
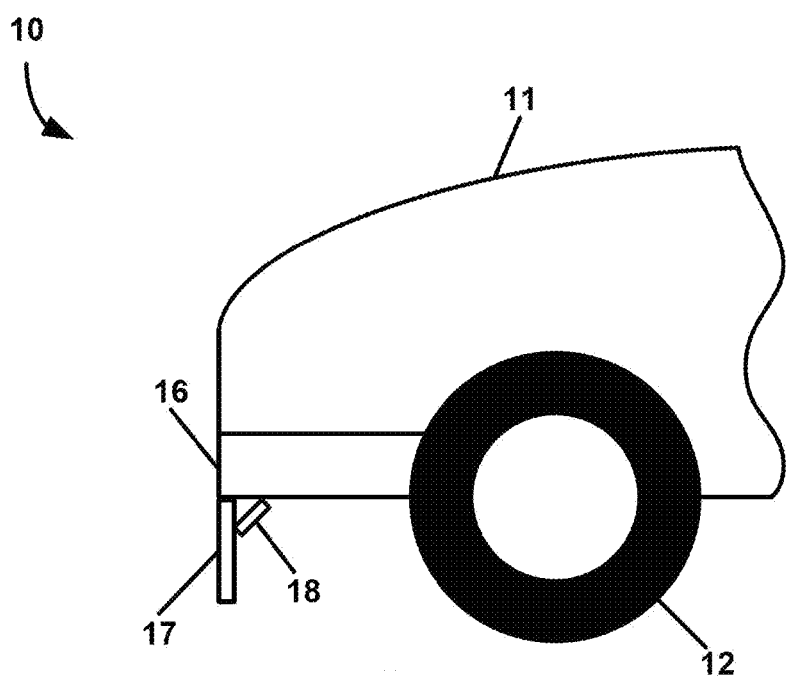
Figure 9:
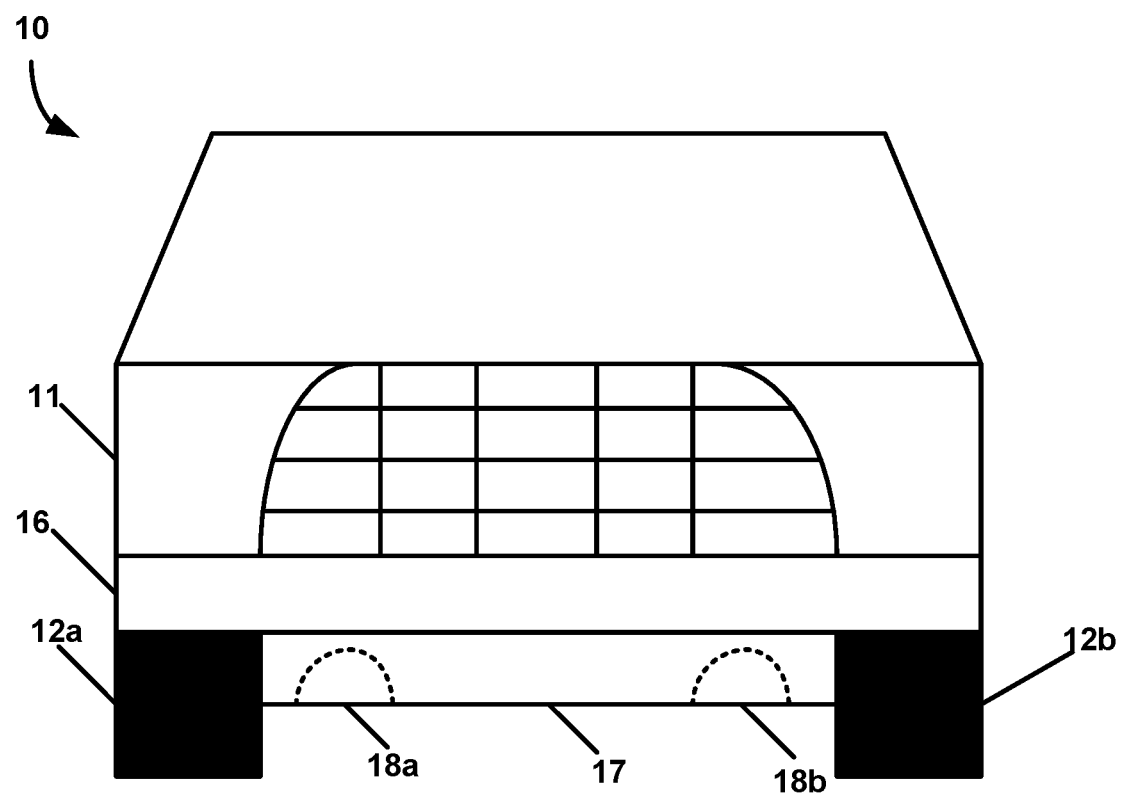
FIG. 9 illustrate an example vehicle, in accordance with one or more embodiments shown and described herein.

In the illustrated examples of FIGS. 4 to 6, a flowchart of methods 400, 500, and 600 for controlling a vehicle. In one or more examples, the respective flowcharts of the methods 400, 500, and 600 may be implemented by the one or more processors 21. For example, the one or more processors 21 are configured to implement the methods 400, 500, and 600 using logic instructions (e.g., software), configurable logic, fixed-functionality hardware logic, etc., or any combination thereof. In one or more examples, software executed by the control module 20 provides functionality described or illustrated herein. In particular, software (e.g., stored on a non-transitory computer-readable medium)) executing by the one or more processors 21 is configured to perform one or more processing blocks of the methods 400, 500, and 600 set forth, described, and/or illustrated herein, or provides functionality set forth, described, and/or illustrated.

In the illustrated example of FIG. 4, illustrated process block 402 includes dynamically detecting a current position/orientation of the vehicle air vents, a current temperature of the wheel brakes, and a current speed of the vehicle.

The method 400 may then proceed to illustrated process block 404, which includes dynamically conducting, in response to the detection, vehicle brake analysis of the sensor data.

The method 400 may then proceed to illustrated process block 406, which includes dynamically controlling, in response to the vehicle brake analysis and wireless network data, the vehicle air vents between a first position/orientation to enhance the aerodynamic performance of the vehicle and a second position/orientation to selectively direct ambient airflow to the wheel brakes in a manner that selectively cools the wheel brakes. The method 400 may terminate or end after execution of process block 406.

In the illustrated example of FIG. 5, illustrated process block 502 includes dynamically detecting a current position/orientation of the vehicle air vents, a current temperature of the wheel brakes, and a current speed of the vehicle.

The method 500 may then proceed to illustrated process block 504, which includes dynamically conducting, in response to the detection, vehicle brake analysis of the sensor data.

The method 500 may then proceed to illustrated process block 506, which includes dynamically adjusting, in response to the vehicle brake analysis and network data that includes one or more of geographic map data, weather data, crowdsourced traffic data, and roadside sign data, a spatial position/orientation of the vehicle air vents to selectively direct ambient airflow directly to the wheel brakes in a manner that selectively cools the wheel brakes. The method 500 may terminate or end after execution of process block 506.

In the illustrated example of FIG. 6, illustrated process block 602 includes dynamically detecting a current position/orientation of the vehicle air vents, a current temperature of the wheel brakes, and a current speed of the vehicle.

The method 600 may then proceed to illustrated process block 604, which includes dynamically conducting, in response to the detection, vehicle brake analysis of the sensor data.

The method 600 may then proceed to illustrated process block 606, which includes dynamically thermally managing, in response to the vehicle brake analysis and wireless network data that includes one or more of geographic map data, weather data, crowdsourced traffic data, and roadside sign data, the wheel brakes by selectively directing ambient airflow to the wheel brakes via the vehicle air vents in a manner that selectively cools the wheel brakes. The method 600 may terminate or end after execution of process block 606.

The terms "coupled," "attached," or "connected" may be used herein to refer to any type of relationship, direct or indirect, between the components in question, and may apply to electrical, mechanical, fluid, optical, electromagnetic, electromechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the embodiments of the present disclosure may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A vehicle brake cooling system, comprising:
a wireless network interface to receive, from one or more external source devices, wireless network data that includes one or more of the geographic map data, weather data, crowdsourced traffic data, and roadside sign data;
one or more a vehicle air vents moveable between a first position and a second position;
an air channel member defining an air circuit having an air inlet to receive ambient airflow in the second position of the vehicle air vents, and one or more air outlets that directs the ambient airflow to a front vehicle brake and a rear vehicle brake; and
one or more processors, to execute a set of instructions that cause the one or more processors to dynamically:
conduct, in response to a detection as sensor data one or more of a current position of the vehicle air vents, a current temperature of vehicle wheel brakes, and a current speed of the vehicle, a vehicle brake analysis of the sensor data;
receive the wireless network data; and
control, in response to the vehicle brake analysis and the wireless network data, the vehicle air vents between the first position to enhance the aerodynamic performance of the vehicle and the second position to selectively expose the air inlet.

2. The vehicle brake cooling system of claim 1, wherein the set of instructions, when executed by the one or more processors, cause the one or more processors to compare the current temperature of the vehicle wheel brakes to a predetermined threshold temperature.

3. The vehicle brake cooling system of claim 2, wherein the set of instructions, when executed by the one or more processors, cause the one or more processors to dynamically control the vehicle air vents by moving the vehicle air vents to the second position when the detected current temperature is greater than the predetermined threshold temperature.

4. The vehicle brake cooling system of claim 1, wherein the vehicle air vents are arranged in a vehicle spoiler to direct ambient airflow to the front vehicle wheel brakes.

5. The vehicle brake cooling system of claim 1, wherein the vehicle air vents are arranged in a vehicle underbody to direct ambient airflow to the rear vehicle wheel brakes.

6. The vehicle brake cooling system of claim 1, wherein the vehicle air vents are arranged in one or more vehicle side panels to direct ambient airflow to the rear vehicle wheel brakes.

7. A computer program product for a vehicle having a front vehicle wheel brakes, a rear vehicle brake, one or more vehicle air vents, and an air channel member defining an air circuit having an air inlet and one or more air outlets, the computer program product including at least one computer readable medium comprising a set of instructions, which when executed by one or more processors, cause the one or more processors to dynamically:
- detect, as sensor data, a current position of the vehicle air vents, a current temperature of the vehicle wheel brakes, and a current speed of the vehicle;
- conduct, in response to the detection, vehicle brake analysis of the sensor data;
- receive wireless network data comprising one or more of geographic map data, weather data, crowdsourced traffic data, and roadside sign data; and
- control, in response to the vehicle brake analysis and the wireless network data, the vehicle air vents between a first position to enhance the aerodynamic performance of the vehicle and a second position to selectively expose the air inlet in a manner that facilitates ambient airflow to be directed by the one or more air outlets to the front vehicle brake and the rear vehicle brake.

8. The computer program product of claim 7, wherein the set of instructions, when executed by the one or more processors, cause the one or more processors to compare the current temperature of the vehicle wheel brakes to a predetermined threshold temperature.

9. The computer program product of claim 8, wherein the set of instructions, when executed by the one or more processors, cause the one or more processors to dynamically control the vehicle air vents by moving the vehicle spoiler to the second position when the detected current temperature is greater than the predetermined threshold temperature.

10. The computer program product of claim 7, wherein the vehicle air vents are arranged in a vehicle spoiler to direct ambient airflow to the front vehicle wheel brakes.

11. The computer program product of claim 7, wherein the vehicle air vents are arranged in a vehicle underbody to direct ambient airflow to the rear vehicle wheel brakes.

12. The computer program product of claim 7, wherein the vehicle air vents are arranged in one or more vehicle side panels to direct ambient airflow to the rear vehicle wheel brakes.

13. A method of controlling a vehicle having a front vehicle wheel brakes, a rear vehicle brake, one or more vehicle air vents, and an air channel member defining an air circuit having an air inlet and one or more air outlets, the method comprising:
- dynamically detecting a current position of the vehicle air vents, a current brake temperature of the vehicle wheel brakes, and a current speed of the vehicle;
- dynamically conducting, in response to the detection, vehicle brake analysis of the sensor data;
- dynamically receiving wireless network data comprising one or more of geographic map data, weather data, crowdsourced traffic data, and roadside sign data; and
- dynamically controlling, in response to the vehicle brake analysis and the wireless network data, the vehicle air vents between a first position to enhance the aerodynamic performance of the vehicle and a second position to selectively expose the air inlet in a manner that facilitates ambient airflow to be directed by the one or more air outlets to the front vehicle brake and the rear vehicle brake.

14. The method of claim 13, wherein dynamically conducting the vehicle brake analysis comprises comparing the detected current brake temperature of the vehicle wheel brakes to a predetermined threshold brake temperature.

15. The method of claim 14, wherein dynamically controlling the vehicle spoiler comprises moving the vehicle air vents to the second position when the detected current brake temperature is greater than the predetermined threshold brake temperature.

16. The method of claim 13, further comprising arranging the vehicle air vents in a vehicle spoiler to direct ambient airflow to the front vehicle wheel brakes.

17. The method of claim 13, further comprising arranging the vehicle air vents in a vehicle underbody to direct ambient airflow to the rear vehicle wheel brakes.

18. The method of claim 13, further comprising arranging the vehicle air vents in one or more vehicle side panels to direct ambient airflow to the rear vehicle wheel brakes.

* * * * *